United States Patent
Nyamwange

(10) Patent No.: US 12,028,355 B2
(45) Date of Patent: Jul. 2, 2024

(54) ENHANCING HYBRID TRADITIONAL NEURAL NETWORKS WITH LIQUID NEURAL NETWORK UNITS FOR CYBER SECURITY AND OFFENSE PROTECTION

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 267 days.

(21) Appl. No.: 17/550,565

(22) Filed: Dec. 14, 2021

(65) Prior Publication Data

US 2023/0188542 A1 Jun. 15, 2023

(51) Int. Cl.
*H04L 9/40* (2022.01)
*G06N 3/045* (2023.01)

(52) U.S. Cl.
CPC ......... *H04L 63/1416* (2013.01); *G06N 3/045* (2023.01)

(58) Field of Classification Search
CPC . H04L 63/14; H04L 63/1416; H04L 63/1433; G06N 3/08; G06N 3/045; G06N 3/02
See application file for complete search history.

(56) References Cited

U.S. PATENT DOCUMENTS

| | | | | |
|---|---|---|---|---|
| 7,979,368 B2* | 7/2011 | Kapoor | ................... | H04L 63/14 706/45 |
| 9,946,719 B2* | 4/2018 | Bowman | ............... | G06F 9/5077 |
| 10,171,495 B1* | 1/2019 | Bowen | ................ | H04L 63/1425 |
| 10,250,617 B1 | 4/2019 | Gardner et al. | | |
| 10,581,805 B2* | 3/2020 | Simons | .................. | G06N 20/00 |
| 10,776,495 B2* | 9/2020 | Sanossian | ............. | G06F 21/577 |
| 11,025,540 B2* | 6/2021 | Landau | .................... | H04L 45/20 |
| 11,025,666 B1* | 6/2021 | Han | ..................... | H04L 63/1416 |
| 11,531,766 B2* | 12/2022 | Sanossian | ............. | G06F 21/577 |
| 11,651,287 B1* | 5/2023 | Kostakis | ................... | G06F 8/61 706/12 |
| 11,720,691 B2* | 8/2023 | Borowiec | ............. | G06F 21/602 713/189 |
| 11,755,751 B2* | 9/2023 | Child | .................... | G06F 21/566 726/23 |
| 2019/0034631 A1 | 1/2019 | Altman et al. | | |

FOREIGN PATENT DOCUMENTS

CN 108647518 A 10/2018
CN 111131335 B 8/2020

* cited by examiner

*Primary Examiner* — Hosuk Song
(74) *Attorney, Agent, or Firm* — Banner & Witcoff, Ltd.

(57) ABSTRACT

Aspects of the disclosure relate to enhancing hybrid traditional neural networks with liquid neural networks for cyber security and offense protection. A computing platform may receive a request to access enterprise organization data. The computing platform may compare the current request to previous requests to determine whether a similar request was previously processed. If a similar request was not previously processed, the computing platform may flag the request as a threat and may analyze the request. The computing platform may extract data from the request and may use the extracted data to generate rules, threat detection algorithms, and training models. The computing platform may use the rules, threat detection algorithms, and training models to train a deep learning neural network to identify and handle threats to an enterprise organization.

20 Claims, 14 Drawing Sheets

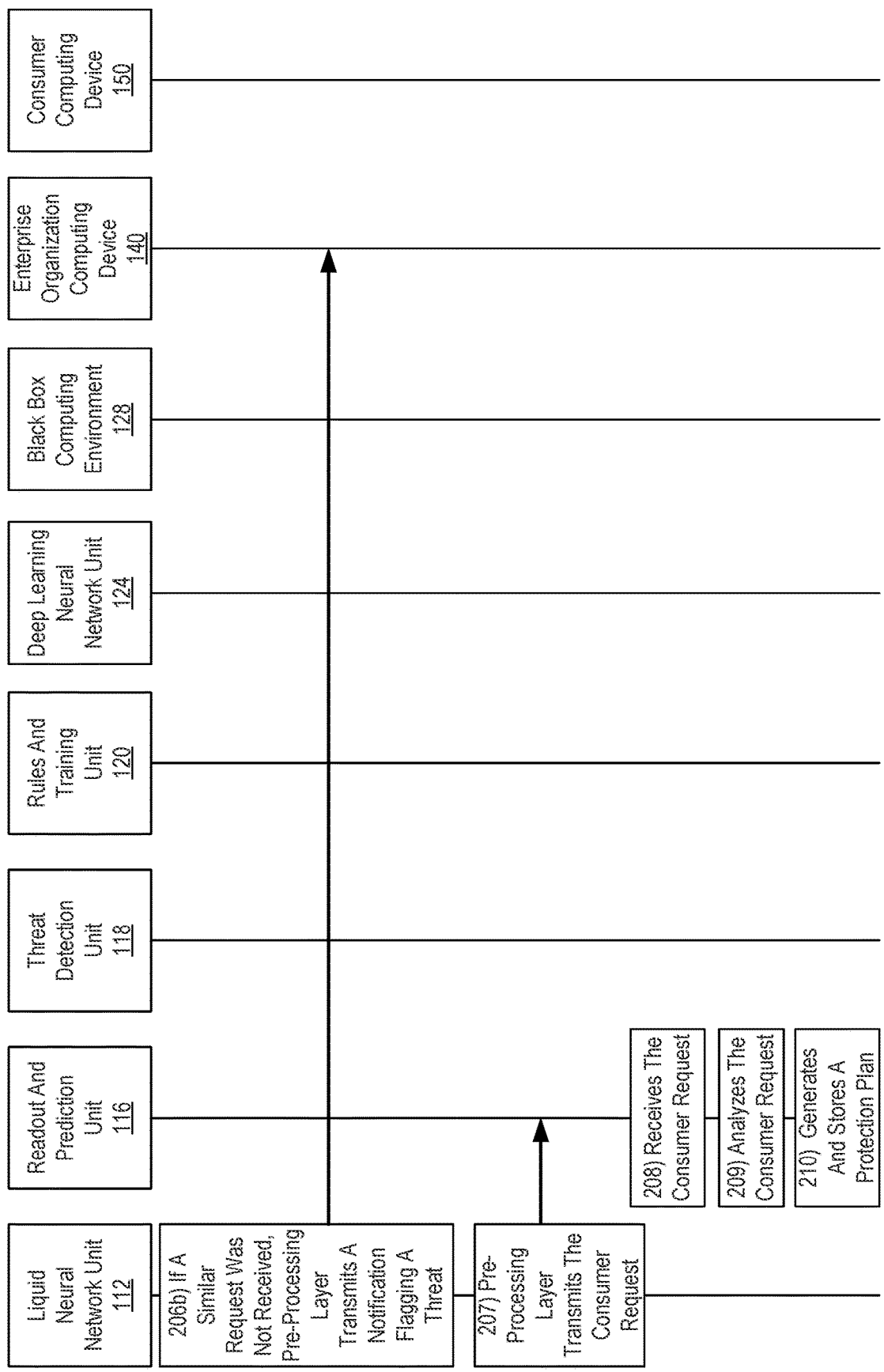

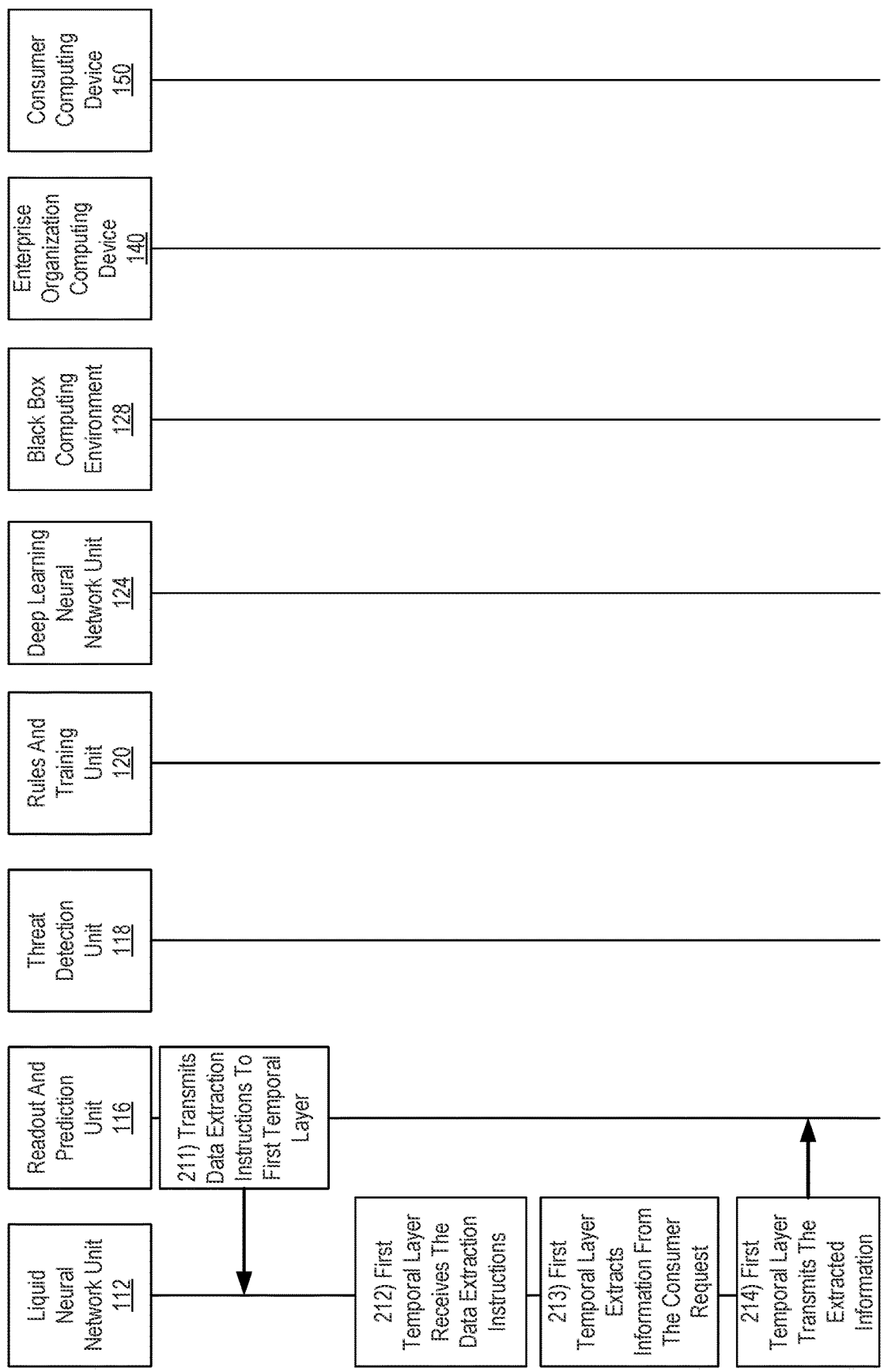

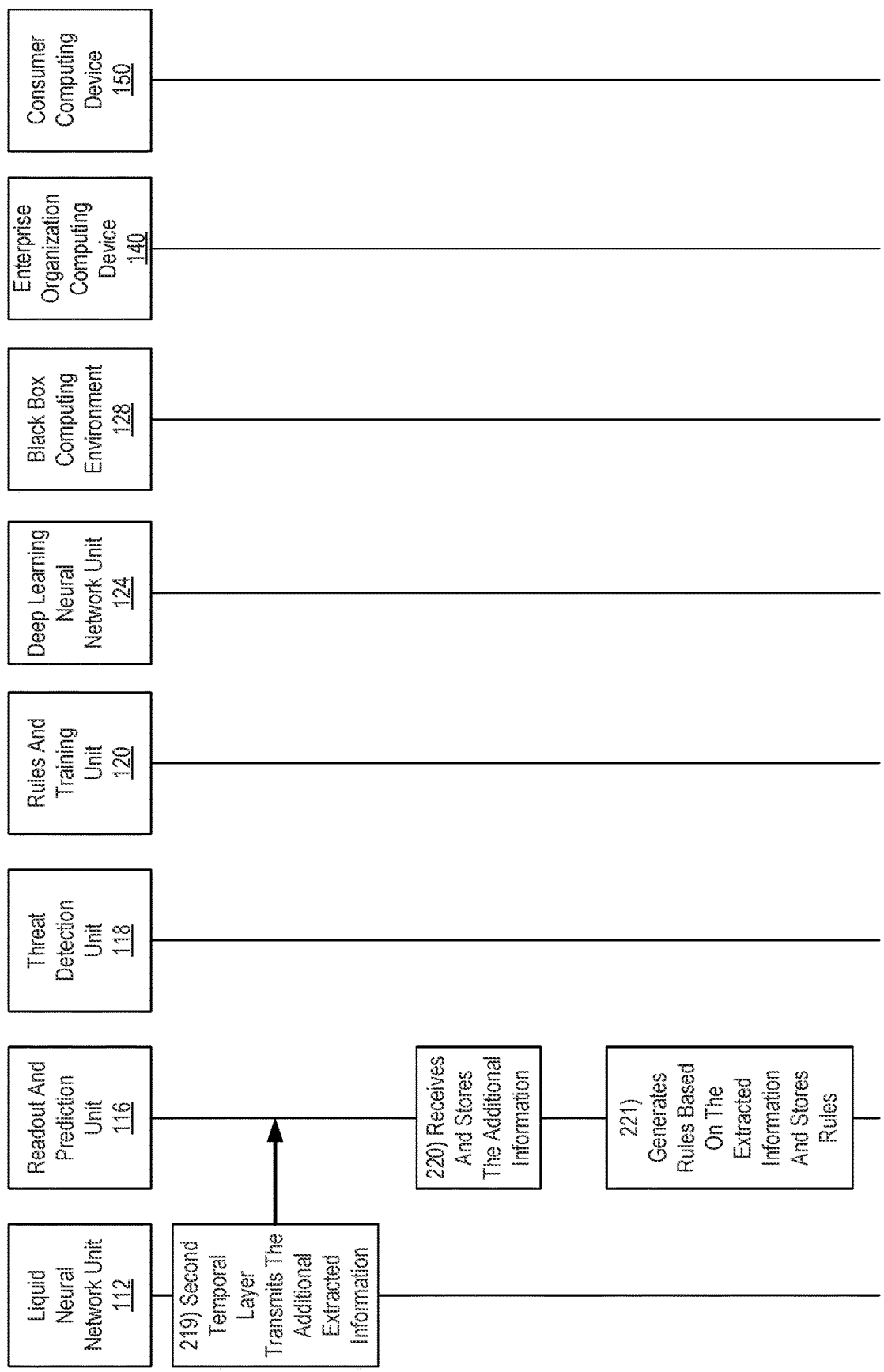

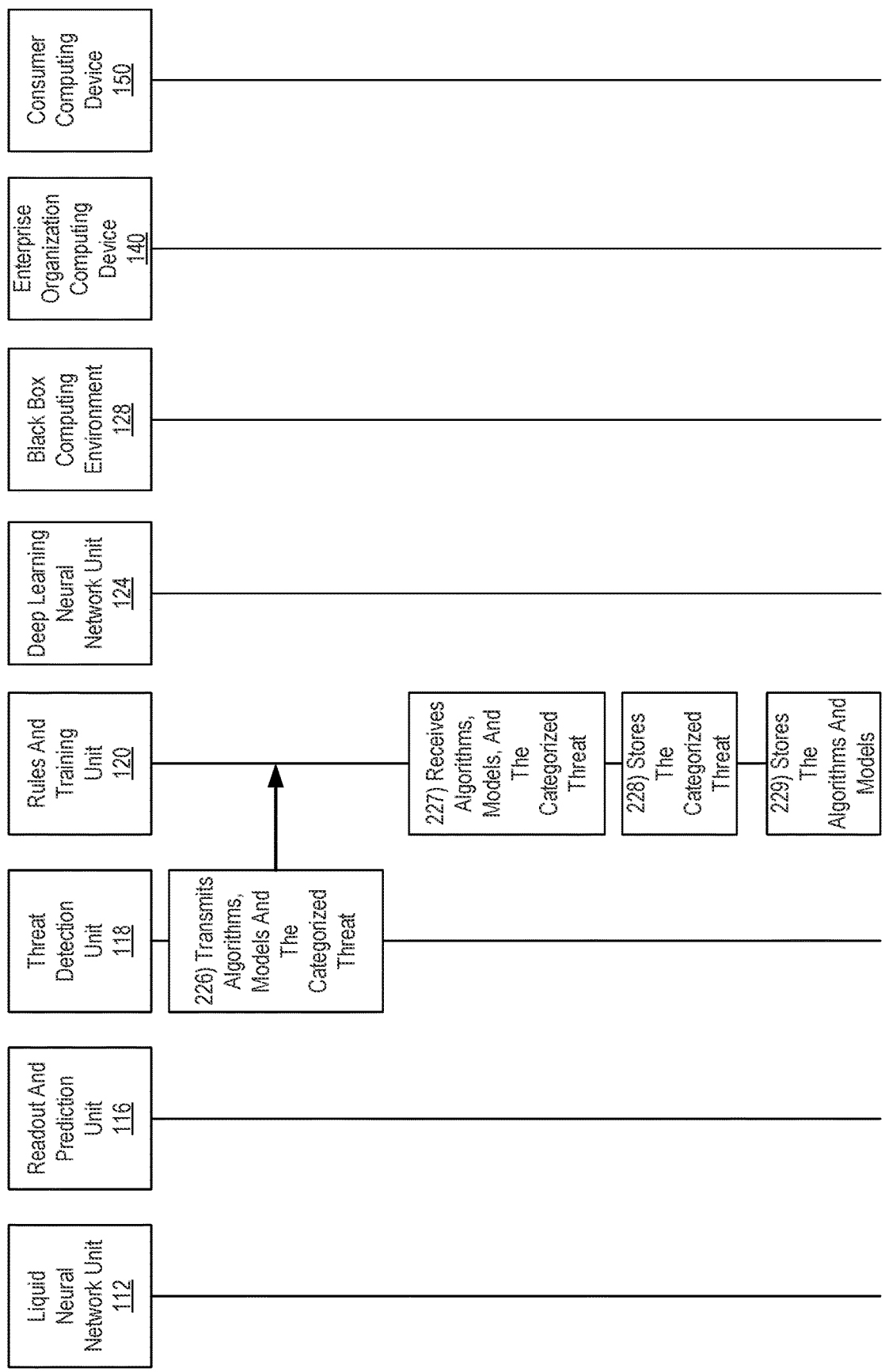

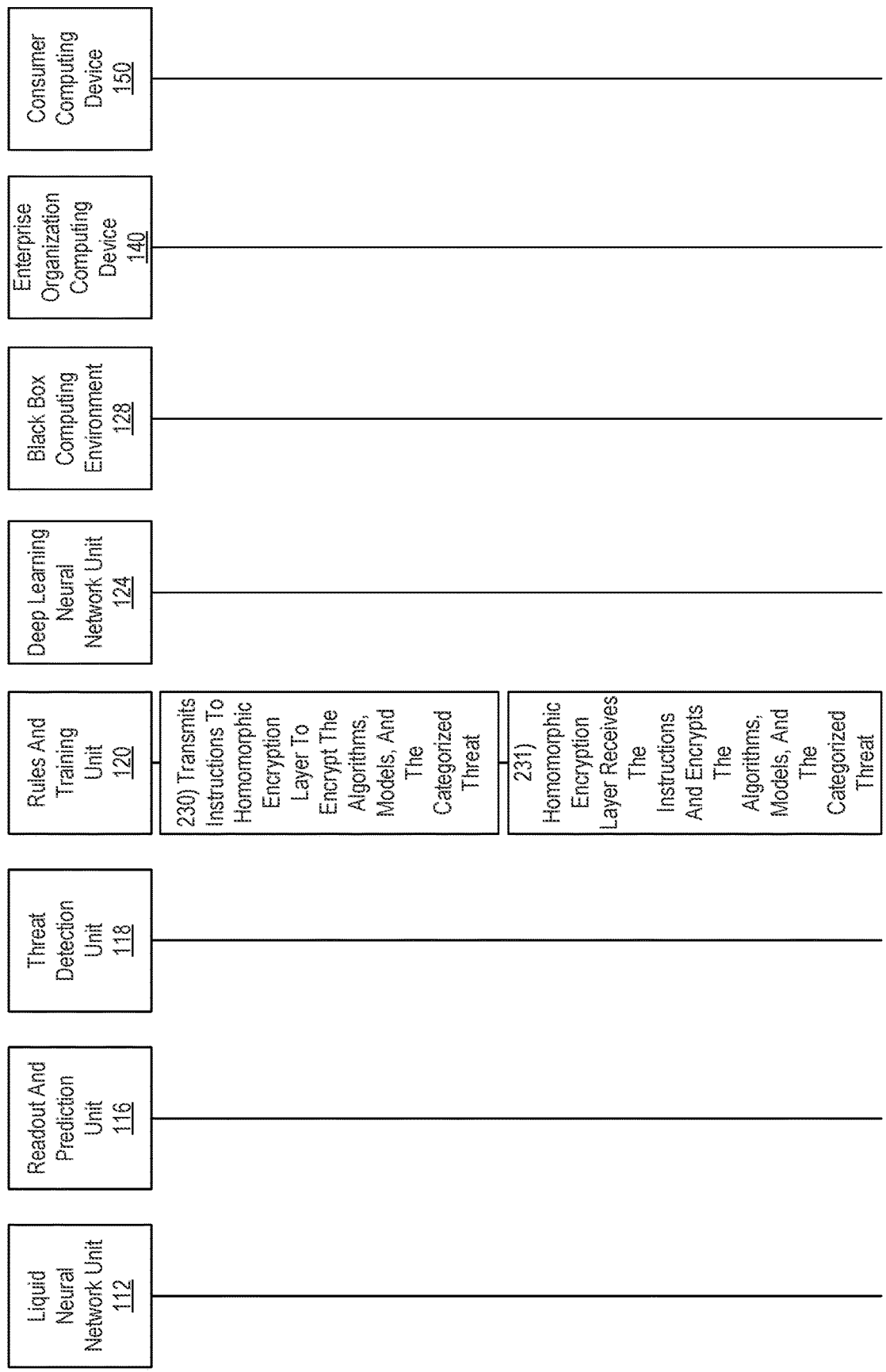

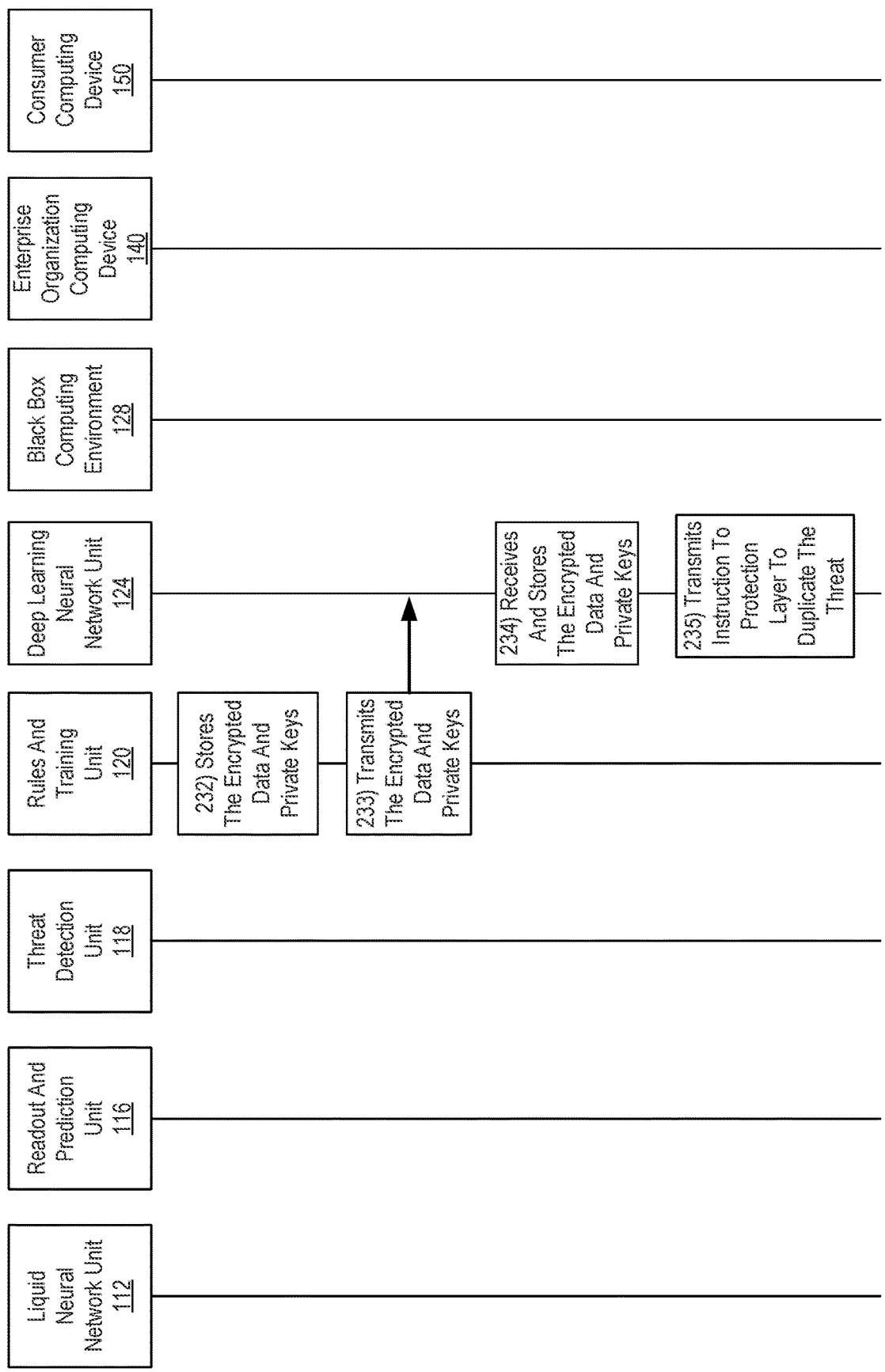

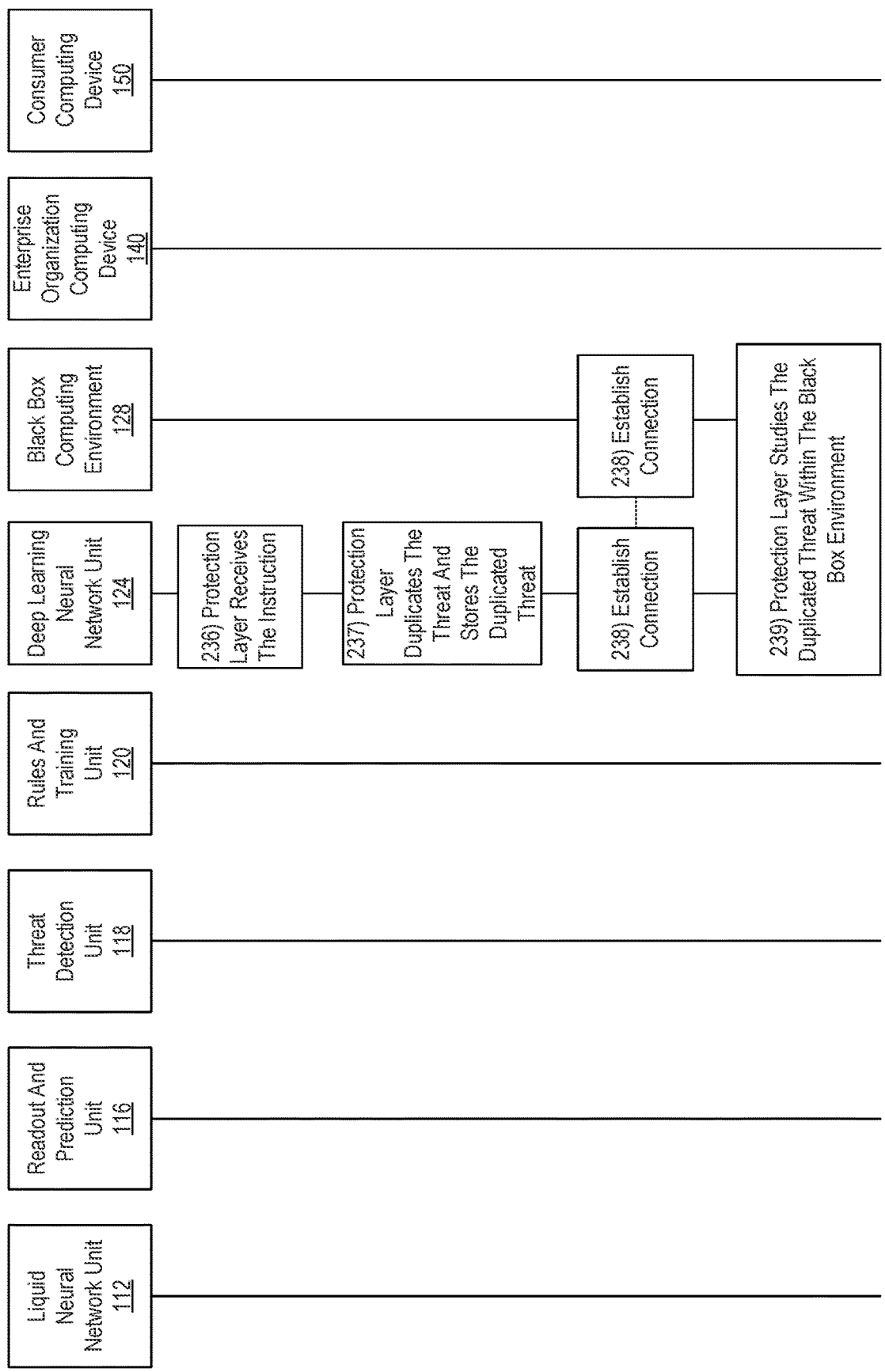

ENHANCING HYBRID TRADITIONAL NEURAL NETWORKS WITH LIQUID NEURAL NETWORK UNITS FOR CYBER SECURITY AND OFFENSE PROTECTION

BACKGROUND

Aspects of the disclosure relate to hardware and/or software for enhancing hybrid traditional neural networks with liquid neural network units for cyber security and offense protection. In particular, one or more aspects of the disclosure relate to examining a consumer request to access enterprise organization data to determine whether the consumer request is a threat and, upon determining that the consumer request is a threat, using a liquid neural network unit to train a deep learning neural network to identify and process the consumer request to provide real-time, or near real-time, offense protection.

As information and communication technology becomes increasingly sophisticated, enterprise organizations that use such technology may face novel security threats. Cyber criminals may adopt new techniques that bolster the scale and speed of cyber security threats (e.g., data breaches, ransomware attacks, or the like). To prevent a new wave of cyber security threats, an enterprise organization may enlist new cyber security data protection measures. For example, an enterprise organization may train an artificial intelligence model to detect a cyber security threat and to diffuse the cyber security threat without compromising the safety of enterprise organization data. However, the knowledge and preparedness of the artificial intelligence model may be limited to the information that the enterprise organization used to train the artificial intelligence model. When faced with a cyber security threat that does not conform to the information within the artificial intelligence model, the artificial intelligence model might not be prepared to handle the threat. Consequently, the artificial intelligence model's inability to diffuse the cyber security threat may, in turn, threaten the security of enterprise organization data. As such, current cyber security and data protection measures fail to provide adaptable, flexible, and robust cyber defense systems that are capable of detecting and handling, in real-time or near real-time, cyber security threats, and of training an artificial intelligence model to detect and handle threats at a later time.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with enhancing hybrid traditional neural networks with liquid neural network units for cyber security and offense protection.

In accordance with one or more embodiments, a method may comprise, at a computing device including one or more processors and memory, receiving a consumer request to access enterprise organization data. The method may comprise determining, by a liquid neural network unit, that the consumer request is a threat to an enterprise organization. The method may comprise generating, by a readout and prediction unit, rules and algorithms to handle the threat. The method may comprise transmitting, to a rules and training unit and from the readout and prediction unit, the rules and the algorithms. The method may comprise encrypting, by the rules and training unit, the rules and the algorithms. The method may comprise transmitting, from the rules and training unit and to a deep learning neural network, the encrypted rules and the encrypted algorithms. The method may comprise training the deep learning neural network to handle the threat using the encrypted rules and the encrypted algorithms. The method may comprise duplicating, by the deep learning neural network and in a black box computing environment, the threat. The method may comprise training the deep learning neural network to detect and handle threat techniques used in the duplicated attack.

In accordance with one or more embodiments, a computing platform may comprise at least one processor, a communication interface communicatively coupled to the at least one processor, and memory storing computer-readable instructions that, when executed by the at least one processor, cause the computing platform to receive a consumer request to access enterprise organization data. The computing platform may determine, by a liquid neural network unit, that the consumer request is a threat to an enterprise organization. The computing platform may generate, by a readout and prediction unit, rules and algorithms to handle the threat. The computing platform may transmit, to a rules and training unit and from the readout and prediction unit, the rules and the algorithms. The computing platform may encrypt, by the rules and training unit, the rules and the algorithms. The computing platform may transmit, from the rules and training unit and to a deep learning neural network, the encrypted rules and the encrypted algorithms. The computing platform may train the deep learning neural network to handle the threat using the encrypted rules and the encrypted algorithms. The computing platform may duplicate, by the deep learning neural network and in a black box computing environment, the threat. The computing platform may train the deep learning neural network to detect and handle threat techniques used in the duplicated attack.

In accordance with one or more embodiments, one or more non-transitory computer-readable media storing instructions that, when executed by a computing platform comprising at least one processor, memory, and a communication interface, cause the computing platform to receive a consumer request to access enterprise organization data. The instructions, when executed, may cause the computing platform to determine, by a liquid neural network unit, that the consumer request is a threat to an enterprise organization. The instructions, when executed, may cause the computing platform to generate, by a readout and prediction unit, rules and algorithms to handle the threat. The instructions, when executed, may cause the computing platform to transmit, to a rules and training unit and from the readout and prediction unit, the rules and the algorithms. The instructions, when executed, may cause the computing platform to encrypt, by the rules and training unit, the rules and the algorithms. The instructions, when executed, may cause the computing platform to transmit, from the rules and training unit and to a deep learning neural network, the encrypted rules and the encrypted algorithms. The instructions, when executed, may cause the computing platform to train the deep learning neural network to handle the threat using the encrypted rules and the encrypted algorithms. The instructions, when executed, may cause the computing platform to duplicate, by the deep learning neural network and in a black box computing environment, the threat. The instructions, when executed, may cause the computing platform to train the deep learning neural network to detect and handle threat techniques used in the duplicated attack.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 2A-2K depict an illustrative event sequence for enhancing hybrid traditional neural networks with liquid neural network units for cyber security and offense protection in accordance with one or more example embodiments.

DETAILED DESCRIPTION

Figure 1A:
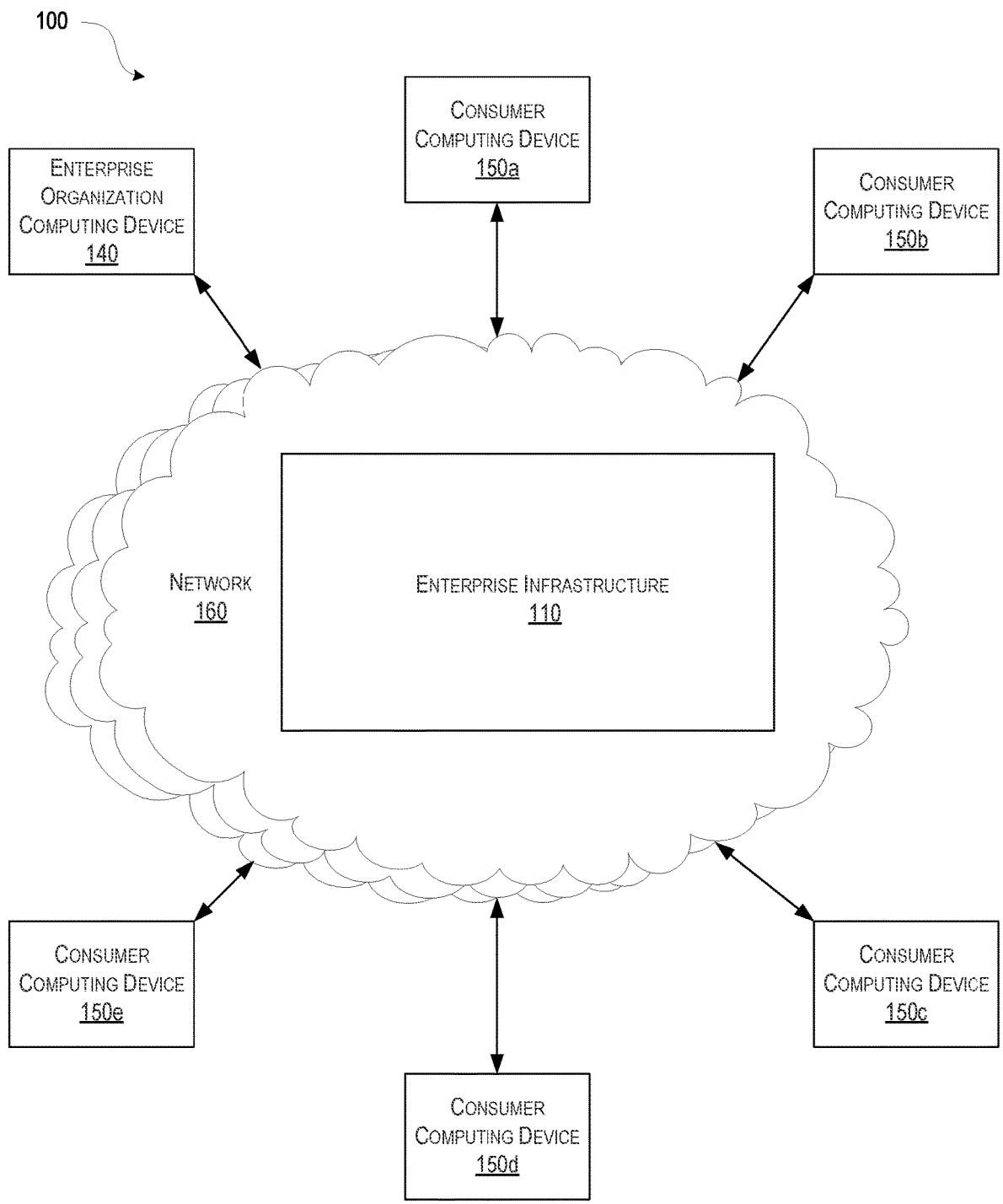
FIG. 1A depicts an illustrative example of a computing environment for enhancing hybrid traditional neural networks with liquid neural network units for cyber security and offense protection in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current cyber security and data protection measures fail to provide adaptable, flexible, and robust cyber defense systems that are capable of identifying, detecting, and handling, in real-time or near real-time, cyber security threats.

Accordingly, proposed herein is a solution to the problem described above that includes enhancing hybrid traditional neural networks with liquid neural network units for cyber security and offense protection. For example, an enterprise organization may receive a request, from a consumer, to access enterprise organization data. The enterprise organization may transmit the consumer request to a liquid neural network unit for processing. A pre-processing layer of the liquid neural network unit may analyze the consumer request and may determine whether the enterprise organization previously received a similar consumer request.

The pre-processing layer may determine that the enterprise organization previously received a similar consumer request. In such instances, the pre-processing layer may transmit a notification to the enterprise organization, wherein the notification may indicate that since a similar consumer request was previously received, the present consumer request is not a threat. Upon determining that the consumer request is not a threat, the pre-processing layer may remove the consumer request from further processing and may handle the present consumer request using the same, or substantially similar, techniques that were used to handle the previously received consumer requests.

Alternatively, the pre-processing layer may determine that the enterprise organization has not received a consumer request that is similar to the present consumer request. In such instances, the pre-processing layer may flag the consumer request as a threat. The pre-processing layer may transmit a notification to the enterprise organization, wherein the notification may indicate that the consumer request may be a threat and that the consumer request may undergo further processing. The pre-processing layer may transmit the consumer request to a readout and prediction unit.

The readout and prediction unit may analyze the consumer request (e.g., identify the enterprise organization data that the consumer is interested in, predict a plurality of methods that the consumer may use to access the enterprise organization data, formulate a strategy to protect the enterprise organization data against each method that the consumer may use to access the enterprise data, or the like). Based on the analysis, the readout and prediction unit may generate a plan to protect the enterprise organization data from the consumer's unauthorized access. The protection plan may identify a plurality of methods that the consumer may use to access the enterprise organization data. For each method within the protection plan, the readout and prediction unit may formulate rules to protect the enterprise organization data. The readout and prediction unit may further develop the rules using data that is extracted from the consumer request by temporal layers of the liquid neural network unit.

A first temporal layer of the liquid neural network unit may extract data from the consumer request. For example, the first temporal layer may extract data (e.g., metadata) that describes the transmission of the consumer request (e.g., a unique identifier associated with the consumer, a unique identifier associated with the consumer computing device, a unique identifier associated with the location of the consumer computing device, or the like). A second temporal layer of the liquid neural network unit may extract additional data from the consumer request. For example, the second temporal layer may extract data that describes the content of the consumer request (e.g., the consumer's affiliation with the enterprise organization, authorization credentials associated with the consumer, whether the consumer request contains embedded data, whether embedded data within the consumer request is malicious data, or the like). The temporal layers of the liquid neural network unit may transmit the extracted data to the readout and prediction unit.

The readout and prediction unit may use the extracted data to further develop the rules within the protection plan. The readout and prediction unit may use the rules within the protection plan to generate threat detection algorithms and training models. The threat detection algorithms may be used to train the deep learning neural network unit how to identify future threats that may be similar to the present consumer request. The training models may be used to train a deep learning neural network to handle a future threat that may be similar to the present consumer request. The readout and prediction unit may transmit the threat detection algorithm and training model to a threat detection unit.

The threat detection unit may identify the threat by analyzing the threat detection algorithms and training models. Using the threat detection algorithms and training models, the threat detection unit may identify the purpose of the consumer request. The threat detection unit may use the determined purpose of the consumer request to categorize the threat (e.g., name the threat, attach a unique identifier to the threat, provide a description of the threat, or the like).

The threat detection unit may transmit the threat detection algorithms, the training models, and the categorized threat to a rules and training unit. The rules and training unit may store the categorized threat in a threat database. The rules and training unit may store the threat detection algorithms and the training models in a training data database. A homomorphic encryption layer of the threat detection unit may encrypt the threat detection algorithms, the training models, and the categorized threat. The rules and training unit may transmit the encrypted data to the deep learning neural network unit.

The deep learning neural network unit may store the encrypted data in a learning database. The deep learning neural network unit may establish a connection with a black box computing environment. A protection layer of the deep learning neural network may duplicate the threat within the black box computing environment. The protection layer may study each component of the duplicated threat and may use the duplicated threat to train the deep learning neural network to identify and process similar consumer threats.

Computer Architecture

FIG. 1A depicts an illustrative example of a computing environment 100 that may be used for enhancing hybrid traditional neural networks with liquid neural network units for cyber security and offense protection. Computing environment 100 may comprise one or more computing devices, including at least enterprise infrastructure 110, enterprise organization computing device 140, and consumer computing devices 150a-150e. While FIG. 1A depicts more than one consumer computing device (e.g. consumer computing devices 150a-150e), each of consumer computing devices 150a-150e may be configured in accordance with the features described herein. While the description herein may make reference to consumer computing device 150, it is important to note that the functions described in connection with consumer computing device 150 may also be performed by any one of consumer computing devices 150a-150e. Each one of consumer computing devices 150a-150e and enterprise organization computing device 140 may be configured to communicate with enterprise infrastructure 110 across network 160. In some arrangements, computing environment 100 may include additional computing devices and cloud environments that are not depicted in FIG. 1A, which may also be configured to interact with enterprise infrastructure 110 and, in some instances, consumer computing device 150.

Enterprise infrastructure 110 may be associated with a centralized entity such as an enterprise organization, company, school, government, or the like, and may comprise one or more devices (e.g., enterprise organization computing device 140 and consumer computing device 150), such as personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), or the like.

Enterprise infrastructure 110 may include computing hardware and/or software that may host various data and applications for performing tasks of the centralized entity and interacting with consumer computing device 150, as well as other computing devices. As discussed in detail in connection with FIG. 1B, enterprise infrastructure 110 may comprise consumer request database 111, liquid neural network unit 112, readout and prediction unit 116, threat detection unit 118, rules and training unit 120, deep learning neural network unit 124, black box computing environment 128, processor(s) 129, and database 130.

Each computing device within enterprise infrastructure 110 may contain processor(s) 129 and database 130, which may be stored in memory of the one or more computing devices of enterprise infrastructure 110. Through execution of computer-readable instructions stored in memory, the computing devices of enterprise infrastructure 110 may be configured to perform functions of the centralized entity and store the data generated during the performance of such functions in database 130.

In some arrangements, enterprise infrastructure 110 may include and/or be part of enterprise information technology infrastructure and may host a plurality of enterprise applications, enterprise databases, and/or other enterprise resources. Such applications may be executed on one or more computing devices included in enterprise infrastructure 110 using distributed computing technology or the like. In some instances, enterprise infrastructure 110 may include a relatively large number of servers that may support operations of the enterprise organization, such as a financial institution.

Enterprise organization computing device 140 may be configured to interact with enterprise infrastructure 110 across network 160. Enterprise organization computing device 140 may be associated with an enterprise organization. Enterprise organization computing device 140 may receive a consumer request, from consumer computing device 150, to access enterprise organization data. Enterprise organization computing device 140 may transmit the received consumer request to enterprise infrastructure 110, which may engage a plurality of training and defense units to process the consumer request. In particular, enterprise organization computing device 140 may transmit the consumer request to liquid neural network unit 112 for processing.

Enterprise organization computing device 140 may receive a notification from pre-processing layer 113 of liquid neural network unit 112. In some instances, the notification may indicate that the consumer request is similar to at least one consumer request that was previously transmitted from consumer computing device 150 to enterprise organization computing device 140. The notification may indicate that the consumer request might not be a threat since a similar consumer request was previously processed and analyzed. The notification may further indicate that the consumer request may be processed using the same, or substantially similar, techniques that were used to process the previously received consumer request.

Alternatively, in some instances, the notification may indicate that the consumer request is not similar to the consumer requests that were previously transmitted from consumer computing device 150 to enterprise organization computing device 140. The notification may further indicate that pre-processing layer 113 may transmit the consumer request to readout and prediction unit 116 for analysis.

Consumer computing device 150 may be configured to interact with enterprise organization computing device 140 across network 160. In some instances, consumer computing device 150 may be configured to receive and transmit information corresponding to system requests through particular channels and/or representations of webpages and/or applications associated with enterprise infrastructure 110.

Consumer computing device 150 may be associated with entities within the enterprise organization or may be associated with entities outside of the enterprise organization. If consumer computing device 150 is associated with an entity within the enterprise organization, the entity associated with consumer computing device 150 may be different from the entity associated with enterprise organization computing device 140. For example, the entity within the enterprise organization that is associated with consumer computing device 150 may be associated with a level of authorization that is more restrictive than the level of authorization associated with enterprise organization computing device 140. Alternatively, consumer computing device 150 may be associated with an entity outside of the enterprise organization. If consumer computing device 150 is associated with an entity outside of the enterprise organization, consumer computing device 150 may be associated with a level of authorization that is more restrictive than the level of authorization associated with either one of enterprise organization computing device 140 or consumer computing device 150 when consumer computing device 150 is associated with an entity within the enterprise organization.

Consumer computing device 150 may transmit, to enterprise organization computing device 140, a request to access enterprise organization data (e.g., client files within a financial institution, client account balances and client account numbers within a financial institution, authorization credentials for accessing a mainframe computing system within a financial institution, or the like). Consumer computing device 150 may transmit the request across network 160.

Computing environment 100 also may include one or more networks, which may interconnect one or more of enterprise infrastructure 110, enterprise organization computing device 140, and consumer computing device 150. For example, computing environment 100 may include network 160. Network 160 may include one or more sub-networks (e.g., local area networks (LANs), wide area networks (WANs), or the like).

Figure 1B:
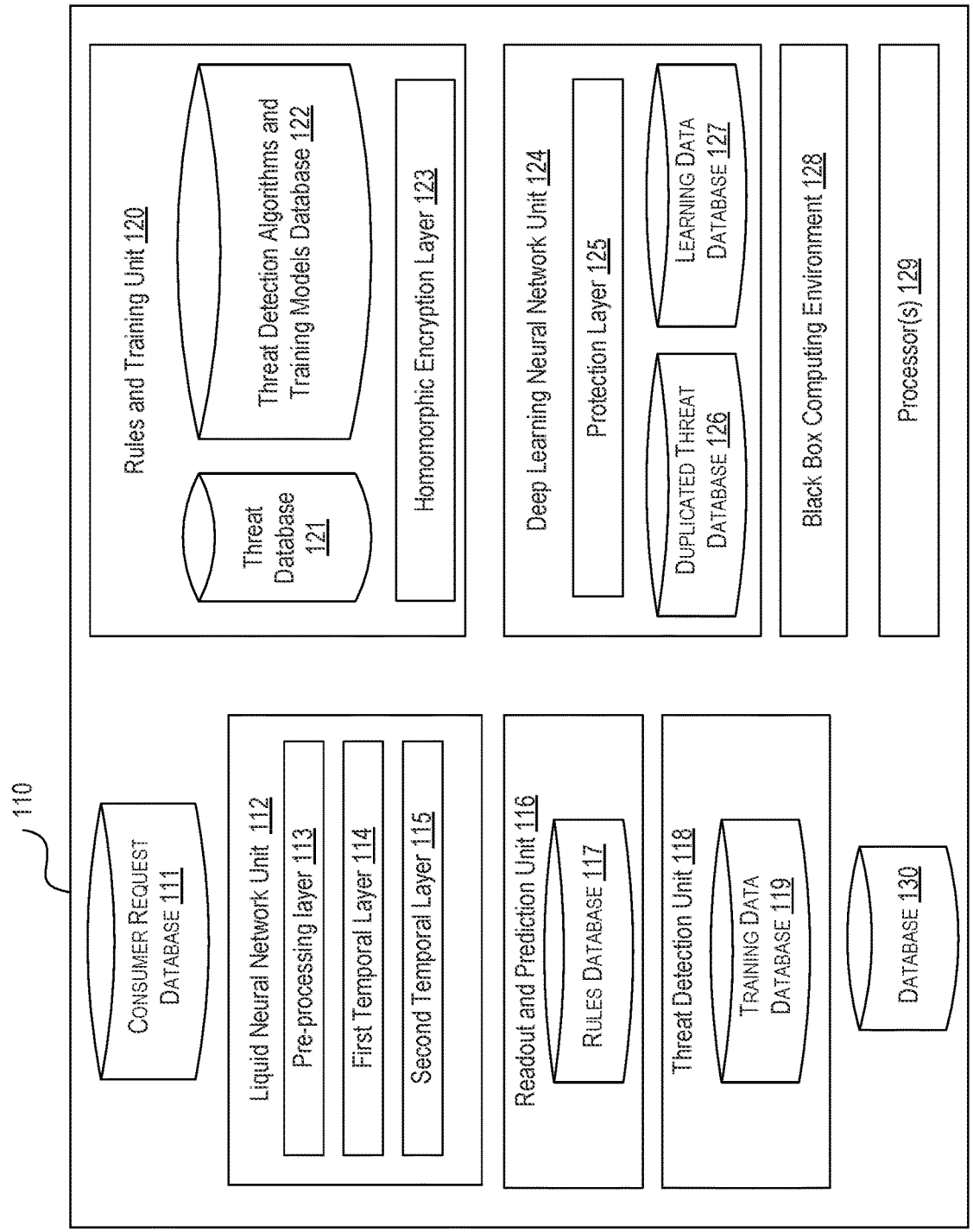
FIG. 1B depicts an illustrative example of the enterprise infrastructure that may be used for enhancing hybrid traditional neural networks with liquid neural network units for cyber security and offense protection in accordance with one or more example embodiments.

FIG. 1B depicts the components of enterprise infrastructure 110 that may be used for enhancing hybrid traditional neural networks with liquid neural network units for cyber security and offense protection. As discussed above, enterprise infrastructure 110 may contain consumer request database 111, liquid neural network unit 112, readout and prediction unit 116, threat detection unit 118, rules and training unit 120, deep learning neural network unit 124, black box computing environment 128, processor(s) 129, and database 130.

Consumer request database 111 may contain the consumer requests that may be transmitted to liquid neural network unit 112 from enterprise organization computing device 140. Consumer request database 111 may further contain data that may be extracted from the consumer request by the temporal layer(s) of liquid neural network unit 112 (e.g., first temporal layer 114 and second temporal layer 115). While only two temporal layers are depicted in FIG. 1B, more than two temporal layers may exist within liquid neural network unit 112 without departing from the present disclosure. Two temporal layers are depicted in FIG. 1B solely for illustration purposes. Each one of pre-processing layer 113, temporal layers of liquid neural network unit 112 (e.g., first temporal layer 114 and second temporal layer 115), and readout and prediction unit 116 may be associated with a first level of access (e.g, a least restrictive level of access). As such, pre-processing layer 113, temporal layers of liquid neural network unit 112 (e.g., first temporal layer 114 and second temporal layer 115), and readout and prediction unit 116 may be permitted to perform a number of actions upon the data within consumer request database 111 (e.g., add new data, remove existing data, update existing data, re-organize existing data, query existing data, or the like).

Liquid neural network unit 112 may contain pre-processing layer 113 and temporal layers (e.g., first temporal layer 114 and second temporal layer 115). Liquid neural network unit may be configured to train deep learning neural network unit 124. To do so, liquid neural network unit 112 may screen incoming data (e.g., consumer requests transmitted to liquid neural network unit 112 from enterprise organization computing device 140) to identify novel data that might not have been processed in accordance with the methods described herein (e.g., consumer requests that deep learning neural network unit 124 might not be trained to identify and handle).

Liquid neural network unit 112 may receive, from enterprise organization computing device 140, a consumer request that was transmitted from consumer computing device 150 to enterprise organization computing device 140. Pre-processing layer 113 may store the consumer request in consumer request database 111. Pre-processing layer 113 may analyze the consumer request to determine whether a similar consumer request was previously received and processed using the method described herein. To do so, pre-processing layer 113 may compare the current consumer request to the previously received consumer requests stored in consumer request database 111.

If consumer request database 111 contains a previously processed consumer request that is similar to the current consumer request, pre-processing layer 113 may determine that a similar consumer request may have been previously received and processed. Since a similar consumer request may have been previously received and processed, pre-processing layer 113 may determine that deep learning neural network unit 124 may already know how to identify and handle the current consumer request. In such instances, pre-processing layer 113 may transmit a notification to enterprise organization computing device 140 indicating that the current consumer request might not be flagged as a threat to the enterprise organization. Pre-processing layer 113 may remove the consumer request from further processing and may handle the present consumer request using the same, or substantially similar, techniques that were used to handle the previously received consumer requests.

Alternatively, consumer request database 111 might not contain a previously processed consumer request that is similar to the current consumer request. In such instances, pre-processing layer 113 may determine that deep learning neural network unit 124 might not know how to identify and handle the current consumer request. In such instances, pre-processing layer 113 may transmit a notification to enterprise organization computing device 140 indicating that the current consumer request may be flagged as a threat to the enterprise organization. The notification may further indicate that pre-processing layer 113 may transmit the consumer request to readout and prediction unit 116 for further processing. Pre-processing layer 113 may transmit the consumer request to readout and prediction unit 116 for further processing.

Temporal layer(s) of liquid neural network unit 112 (e.g., first temporal layer 114 and second temporal layer 115) may be configured to extract data from the consumer request. Each temporal layer (e.g., each one of first temporal layer 114 and second temporal layer 115) may parse the consumer request to collect data that may describe the content of the consumer request as well as the metadata surrounding the transmission of the consumer request (e.g., a unique identifier associated with the consumer, a unique identifier associated with consumer computing device 150, a unique identifier associated with the location of consumer computing device 150, the consumer's affiliation with the enterprise organization, authorization credentials associated with the consumer, whether the consumer request contains embedded data, whether embedded data within the consumer request is malicious data, or the like). While two temporal layers are described herein (e.g., first temporal layer 114 and second temporal layer 115), liquid neural network unit 112 may contain more than two temporal layers. Two temporal layers are described herein solely for illustration purposes.

A first temporal layer (e.g., first temporal layer 114) may receive, from readout and prediction unit 116, the consumer request as well as instructions to extract data from the consumer request. The instructions may indicate the type of data to be extracted from the consumer request. For example, the first temporal layer (e.g., first temporal layer 114) may be instructed to extract data (e.g., metadata) that may describe the transmission of the consumer request. The first temporal layer (e.g., first temporal layer 114) may transmit, to readout and prediction unit 116, the data that describes the transmission of the consumer request.

A second temporal layer (e.g., second temporal layer 115) may receive, from readout and prediction unit 116, the consumer request as well as instructions to extract additional data from the consumer request. The instructions may indicate the type of data to be extracted from the consumer request. For example, the second temporal layer (e.g., second temporal layer 115) may be instructed to extract data that may describe the content of the consumer request. The second temporal layer (e.g., second temporal layer 115) may transmit, to readout and prediction unit 116, the data that describes the content of the consumer request. Additional temporal layers (not depicted in FIG. 1B) may receive, from readout and prediction unit 116, the consumer request as well as instructions to further extract data from the consumer request.

Readout and prediction unit 116 may contain rules database 117. Readout and prediction unit 116 may receive, from pre-processing layer 113 of liquid neural network unit 112, the consumer request. Readout and prediction unit 116 may analyze the consumer request. To do so, readout and prediction unit 116 may identify the enterprise organization data that consumer computing device 150 may be interested in and may predict a plurality of methods that consumer computing device 150 may use to access the enterprise organization data. Readout and prediction unit 116 may formulate a plurality of strategies to protect the enterprise organization data against each predicted method that consumer computing device 150 may use to access the enterprise data. Based on the analysis, readout and prediction unit 116 may generate a protection plan to safeguard the enterprise organization data from unauthorized access by consumer computing device 150.

Readout and prediction unit 116 may list, within the protection plan, the plurality of predicted methods that consumer computing device 150 may use to access the enterprise organization data. For each predicted method listed within the protection plan, readout and prediction unit 116 may formulate rules to protect the enterprise organization data. Readout and prediction unit 116 may add the rules to the protection plan. Readout and prediction unit 116 may store the protection plan in rules database 117. Readout and prediction unit 116 may be associated with a first level of access (e.g., a least restrictive level of access). As such, readout and prediction unit 116 may be permitted to perform a number of actions upon the data within rules database 117 (e.g., add new data, remove data, edit data, update data, re-organize data, or the like).

Readout and prediction unit 116 may transmit, to a temporal layer of liquid neural network unit 112 (e.g., one of first temporal layer 114 or second temporal layer 115) instructions to extract data from the consumer request. Readout and prediction unit 116 may transmit, to a first temporal layer (e.g., first temporal layer 114), instructions to extract data (e.g., metadata) that may describe the transmission of the consumer request. Readout and prediction unit 116 may transmit, to a second temporal layer (e.g., second temporal layer 115), instructions to extract data that may describe the content of the consumer request.

Readout and prediction unit 116 may receive, from temporal layers of liquid neural network unit 112 (e.g., first temporal layer 114 and second temporal layer 115), data that was extracted from the consumer request. In some instances, readout and prediction unit 116 may receive, from a first temporal layer (e.g., first temporal layer 114), data (e.g., metadata) that may describe the transmission of the consumer request. In some instances, readout and prediction unit 116 may receive, from a second temporal layer (e.g., second temporal layer 115), data that may describe the content of the consumer request. Readout and prediction unit 116 may store the extracted data in consumer request database 111.

As discussed above, readout and prediction unit 116 may predict a plurality of methods that consumer computing device 150 may use to access the enterprise organization data. Readout and prediction unit 116 may formulate a plurality of strategies to protect the enterprise organization data against each predicted method that consumer computing device 150 may use to access the enterprise data. Each strategy may feature a plurality of rules. To generate the rules, readout and prediction unit 116 may use the extracted data received from the temporal layers of liquid neural network unit 112 (e.g., first temporal layer 114 and second temporal layer 115).

Readout and prediction unit 116 may generate threat detection algorithms and training models. Readout and prediction unit 116 may store the threat detection algorithms and training models in rules database 117.

To generate the threat detection algorithms and training models, readout and prediction unit 116 may use the predicted methods, the strategies, and the rules within the protection plan. The threat detection algorithms may contain rules that may train deep learning neural network unit 124 to identify novel data and to flag the novel data as a potential threat. To generate the threat detection algorithms, readout and prediction unit 116 may use the extracted information received from the temporal layers of liquid neural network unit 112 (e.g., first temporal layer 114 and second temporal layer 115). In some instances, the threat detection algorithms may contain rules for locating, within a consumer request, data that identifies the consumer or the consumer computing device associated with the consumer. In some instances, the threat detection algorithms may contain rules for locating, within a consumer request, data that describes the content of the consumer request and the transmission of the consumer request.

The training models may contain rules that may train deep learning neural network unit 124 to handle novel data that may have been identified as a potential threat. To generate the training models, readout and prediction unit 116 may use the strategies included within the protection plan. The strategies within the protection plan may contain rules (e.g., a course of action) for protecting the enterprise organization data from unauthorized access. In some instances, the training models may contain rules for determining the enterprise organization data that may be at risk (e.g., the enterprise organization data that the consumer may be interested in). In some instances, the training model may contain rules for strengthening the enterprise organization security infrastructure.

Readout and prediction unit 116 may transmit the threat detection algorithms and training models to threat detection unit 118.

Threat detection unit 118 may contain training data database 119. Threat detection unit 118 may receive, from readout and prediction unit 116, threat detection algorithms and training models. Threat detection unit 118 may store the threat detection algorithms and training models within training data database 119. Threat detection unit 118 may be associated with a first level of access (e.g., a least restrictive level of access). As such, threat detection unit 118 may be permitted to perform a number of actions upon the data within training data database 119 (e.g., add new data, remove existing data, edit data, re-organize data, update data, or the like).

Threat detection unit 118 may use the threat detection algorithms and training models to categorize the threat. To do so, threat detection unit 118 may analyze the threat detection algorithms and training models to identify the purpose of the consumer request. Threat detection unit 118 may use the purpose of the consumer request to label the threat (e.g., name the threat, attach a unique identifier to the threat, provide a description of the threat, or the like). Threat detection unit 118 may store the categorized threat in training data database 119.

Threat detection unit 118 may transmit the threat detection algorithms, training models, and categorized threat to rules and training unit 120.

Rules and training unit 120 may contain threat database 121, threat detection algorithms and training models database 122, and homomorphic encryption layer 123. Rules and training unit 120 may receive the threat detection algorithms, training models, and categorized threat transmitted from threat detection unit 118. Rules and training unit 120 may store the categorized threat in threat database 121. Rules and training unit 120 may be associated with a first level of access (e.g., a least restrictive level of access). As such, rules and training unit 120 may be permitted to perform a number of actions upon the data within threat database 121 (e.g., add new data, remove existing data, edit data, re-organize data, update data, or the like). Rules and training unit 120 may store the training models and threat detection algorithms in threat detection algorithms and training models database 122. Rules and training unit 120 may be associated with a first level of access (e.g., a least restrictive level of access). As such, rules and training unit 120 may be permitted to perform a number of actions upon the data within threat detection algorithms and training models database 122 (e.g., add new data, remove existing data, edit data, re-organize data, update data, or the like).

Rules and training unit 120 may transmit, to homomorphic encryption layer 123, instructions to encrypt the threat detection algorithms, the training models, and the categorized threat. Rules and training unit 120 may store the encrypted threat detection algorithms, the encrypted training models, the encrypted categorized threat, and the private keys that may be used to access the encrypted data. Rules and training unit 120 may transmit the encrypted threat detection algorithms, the encrypted training models, the encrypted categorized threat, and the private keys to deep learning neural network unit 124.

Homomorphic encryption layer 123 may receive, from rules and training unit 120, instructions to encrypt the threat detection algorithms, the training models, and the categorized threat, and may encrypt the received data. To do so, homomorphic encryption layer 123 may generate a key pair. The key pair may contain a public key that may be used to encrypt the data and a private key that may be used to access the encrypted data. Homomorphic encryption layer 123 may use the public key to encrypt the threat detection algorithms, the training models, and the categorized threat.

Deep learning neural network unit 124 may contain protection layer 125, duplicated threat database 126, and learning data database 127. Deep learning neural network unit 124 may receive, from rules and training unit 120, the encrypted threat detection algorithms, the encrypted training models, the encrypted categorized threat, and the private keys that may be used to access the encrypted data. Deep learning neural network unit 124 may store the encrypted threat detection algorithms, the encrypted training models, and the encrypted categorized threat in learning data database 127. Deep learning neural network unit 124 may be associated with a first level of access (e.g., a least restrictive level of access). As such, deep learning neural network unit 124 may be permitted to perform a number of actions upon the data within learning data database 127 (e.g., add new data, remove existing data, edit data, re-organize data, update data, or the like). Deep learning neural network unit 124 may use the data within learning data database 127 to process and analyze incoming novel data (e.g., consumer requests).

Deep learning neural network unit 124 may transmit, to protection layer 125, instructions to duplicate the threat. Deep learning neural network unit 124 may establish a network connection with black box computing environment 128. Deep learning neural network unit 124 may establish the connection across network 160.

Protection layer 125 may receive, from rules and training unit 120, instructions to duplicate the threat. To do so, protection layer 125 may use the private key associated with the encrypted categorized threat to access the threat. Protection layer 125 may deconstruct the threat into discrete data components (e.g., discrete pieces of data). Protection layer 125 may duplicate (e.g., clone, copy, or the like) each discrete data component. Protection layer 125 may assemble the duplicated data components such that, when combined, the duplicated data components create an identical threat. Protection layer 125 may store the duplicated attack within duplicated threat database 126. Protection layer 125 may be associated with a first level of access (e.g., a least restrictive level of access). As such, protection layer 125 may be permitted to perform a number of actions upon the data within duplicated threat database 126 (e.g., add new data, remove existing data, edit data, re-organize data, update data, or the like).

Protection layer 125 may use the duplicated threat, within black box computing environment 128, to learn the threat techniques utilized by the consumer associated with consumer computing device 150. Black box computing environment 128 may be associated with transmission criteria that might not be detectable (e.g., an IP address that might not be traced, a network connection that might not be traced, or the like). As such, consumer computing device 150 might not be able to trace the deconstruction and duplication of the threat to protection layer 125 of deep learning neural network unit 124.

Enhancing Hybrid Traditional Neural Networks With Liquid Neural Networks for Cyber Security and Offense Protection FIGS. 2A-2K depict an illustrative event sequence for enhancing hybrid traditional neural networks with liquid neural networks for security and offense protection. The events shown are merely one example sequence, and one or more events may be performed in a different order, omitted, or steps may be added without departing from the present disclosure. One or more aspects described herein may be performed in real-time or near real-time.

Figure 2A:
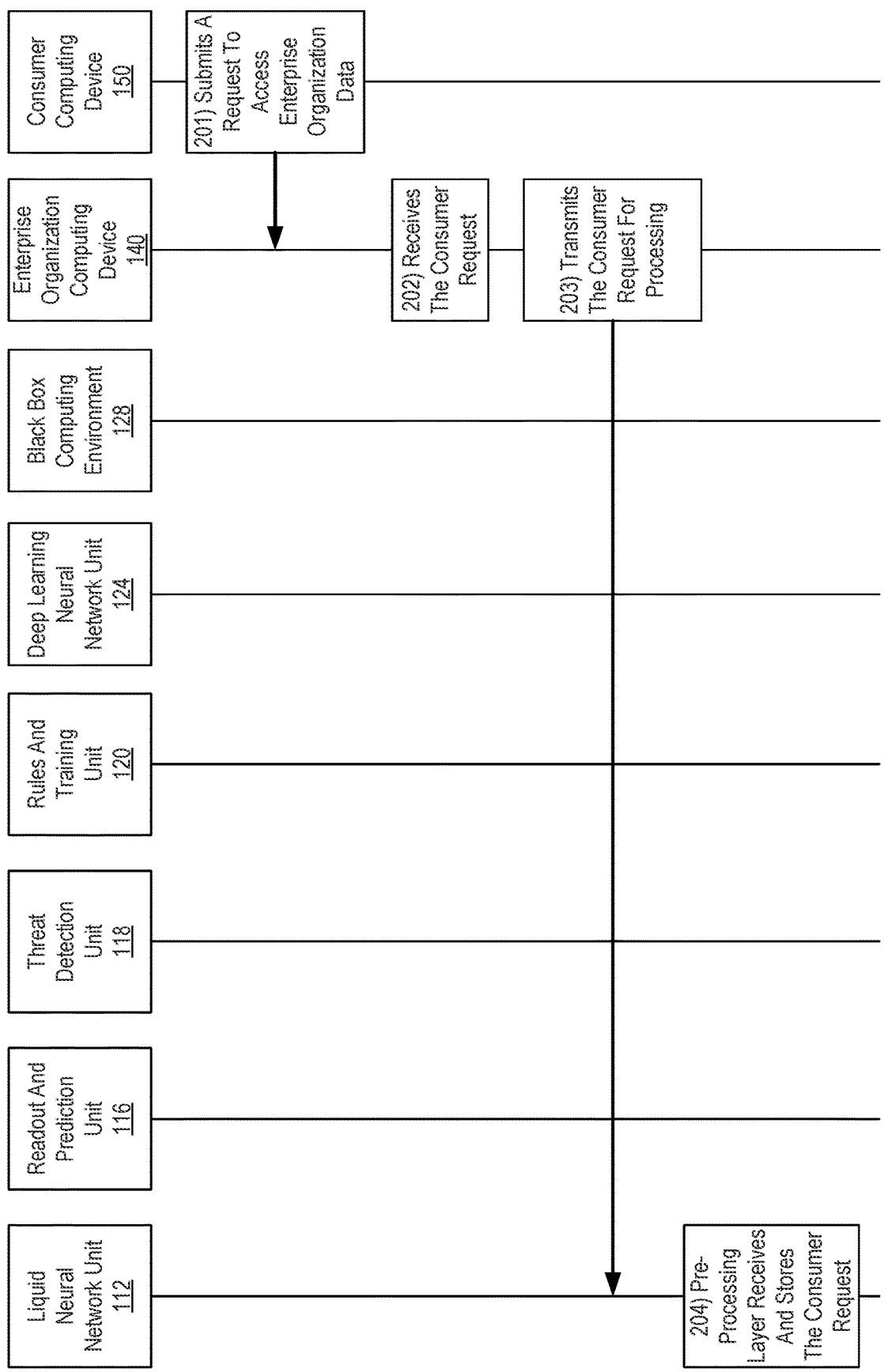

Referring to FIG. 2A, at step 201, consumer computing device 150 may transmit, to enterprise organization computing device 140, a request to access enterprise organization data (e.g., client files within a financial institution, client account balances and client account numbers within a financial institution, authorization credentials for accessing a mainframe computing system within a financial institution, or the like). Consumer computing device 150 may transmit the request across network 160.

At step 202, enterprise organization computing device 140 may receive, from consumer computing device 150, the consumer request to access enterprise organization data. At step 203, enterprise organization computing device 140 may transmit the consumer request to liquid neural network unit 112 for processing.

At step 204, liquid neural network unit 112 may receive, from enterprise organization computing device 140, the consumer request that was transmitted from consumer computing device 150 to enterprise organization computing device 140. Pre-processing layer 113 of liquid neural network unit 112 may store the consumer request in consumer request database 111. Consumer request database 111 may contain the consumer requests that may be transmitted to liquid neural network unit 112 from enterprise organization computing device 140. Consumer request database 111 may further contain data that may be extracted from the consumer request by the temporal layers of liquid neural network unit 112 (e.g., first temporal layer 114 and second temporal layer 115). Each one of pre-processing layer 113, the temporal layers of liquid neural network unit 112 (e.g., first temporal layer 114 and second temporal layer 115), and readout and prediction unit 116 may be associated with a first level of access (e.g., a least restrictive level of access). As such, pre-processing layer 113, the temporal layers of liquid neural network unit 112 (e.g., first temporal layer 114 and second temporal layer 115), and readout and prediction unit 116 may be permitted to perform a number of actions upon the data within consumer request database 111 (e.g., add new data, remove existing data, update existing data, re-organize existing data, query existing data, or the like). While only two temporal layers are described herein, more or less than two temporal layers may exist within liquid neural network unit 112. Two temporal layers are depicted and described solely for illustration purposes.

Figure 2B:
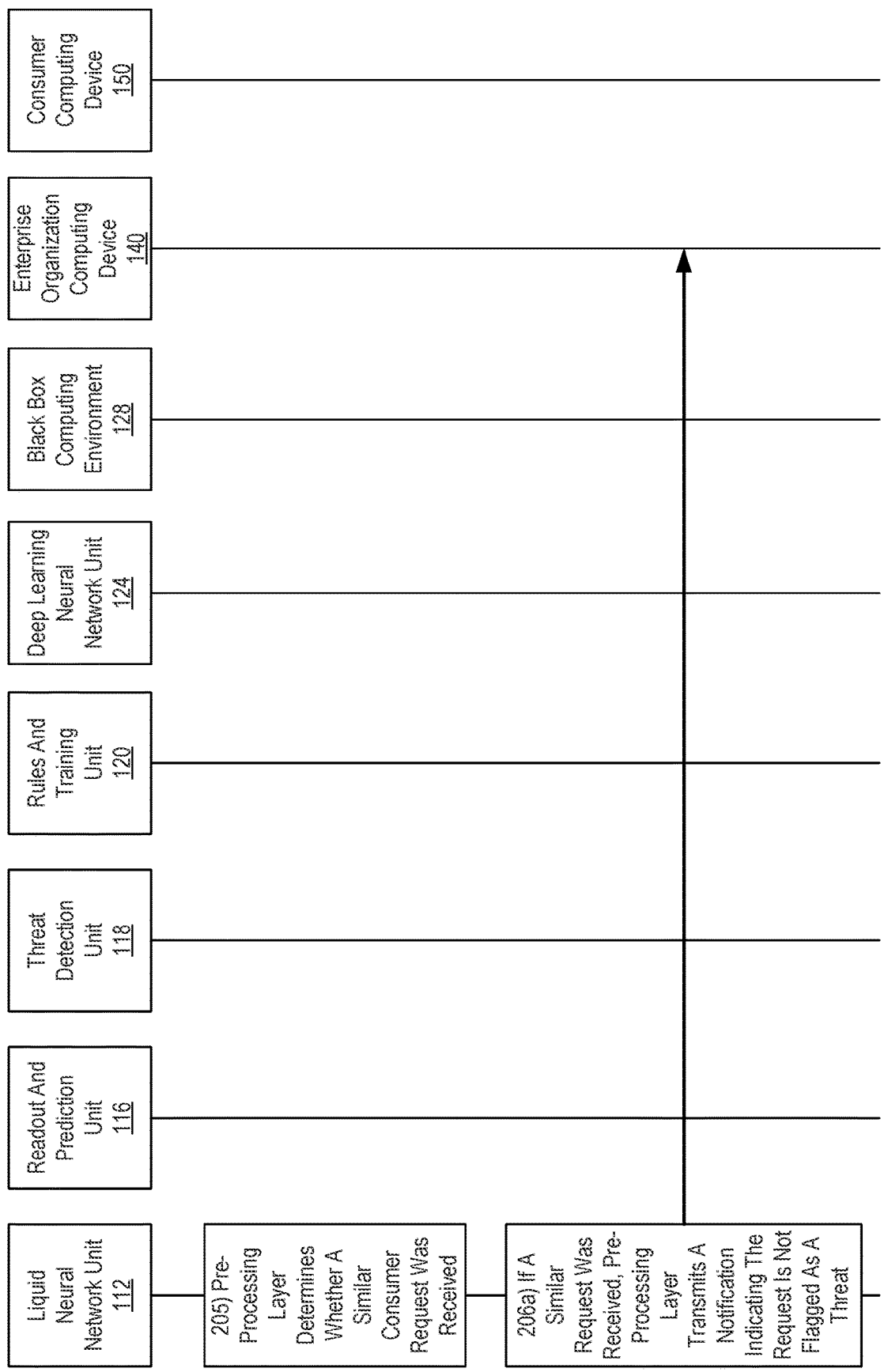

Referring to FIG. 2B, at step 205, pre-processing layer 113 may analyze the consumer request to determine whether a similar consumer request was previously received and processed using the method described herein. To do so, pre-processing layer 113 may compare the current consumer request to the previously received consumer requests stored in consumer request database 111.

At step 206a, pre-processing layer 113 may determine that consumer request database 111 contains a previously processed consumer request that is similar to the current consumer request. As such, pre-processing layer 113 may determine that a similar consumer request may have been previously received and processed. Since a similar consumer request may have been previously received and processed, pre-processing layer 113 may determine that deep learning neural network unit 124 may already know how to identify and handle the current consumer request. In such instances, pre-processing layer 113 may transmit a notification to enterprise organization computing device 140 indicating that the current consumer request might not be flagged as a threat to the enterprise organization. Pre-processing layer 113 may remove the consumer request from further processing and may handle the present consumer request using the same, or substantially similar, techniques that were used to handle the previously received consumer requests.

Alternatively, referring to FIG. 2C at step 206b, pre-processing layer 113 may determine that consumer request database 111 might not contain a previously processed consumer request that is similar to the current consumer request. As such, pre-processing layer 113 may determine that deep learning neural network unit 124 might not know how to identify and handle the current consumer request. In such instances, pre-processing layer 113 may transmit a notification to enterprise organization computing device 140 indicating that the current consumer request may be flagged as a threat to the enterprise organization. The notification may further indicate that pre-processing layer 113 may transmit the consumer request to readout and prediction unit 116 for further processing.

At step 207, pre-processing layer 113 may transmit the consumer request to readout and prediction unit 116 for further processing. At step 208, readout and prediction unit 116 may receive the consumer request from pre-processing layer 113 of liquid neural network unit 112.

At step 209, readout and prediction unit 116 may analyze the consumer request. To do so, readout and prediction unit 116 may identify the enterprise organization data that consumer computing device 150 may be interested in and may predict a plurality of methods that consumer computing device 150 may use to access the enterprise organization data. Readout and prediction unit 116 may formulate a plurality of strategies to protect the enterprise organization data against each predicted method that consumer computing device 150 may use to access the enterprise data.

At step 210, readout and prediction unit 116 may generate a protection plan to safeguard the enterprise organization data from unauthorized access by consumer computing device 150. Readout and prediction unit 116 may list, within the protection plan, the plurality of predicted methods that consumer computing device 150 may use to access the enterprise organization data. For each predicted method listed within the protection plan, readout and prediction unit 116 may formulate rules to protect the enterprise organization data, as described in further detail in step 221. Readout and prediction unit 116 may store the protection plan in rules database 117. Readout and prediction unit 116 may be associated with a first level of access (e.g., a least restrictive level of access). As such, readout and prediction unit 116 may be permitted to perform a number of actions upon the data within rules database 117 (e.g., add new data, remove data, edit data, update data, re-organize data, or the like).

Referring to FIG. 2D, at step 211, readout and prediction unit 116 may transmit, to a temporal layer of liquid neural network unit 112 (e.g., first temporal layer 114), instructions to extract data from the consumer request. At step 212, the first temporal layer (e.g., first temporal layer 114) may receive, from readout and prediction unit 116, the instructions to extract data from the consumer request. The instructions may indicate the type of data to be extracted from the consumer request. For example, the instructions may instruct the first temporal layer (e.g., first temporal layer 114) to extract data that may describe the transmission of the consumer request (e.g., a unique identifier associated with the consumer, a unique identifier associated with the consumer computing device, a unique identifier associated with the location of the consumer computing device, a network used to transmit the consumer request, or the like).

At step 213, the first temporal layer (e.g., first temporal layer 114) may extract data from the consumer request in accordance with the instructions from readout and prediction unit 116. At step 214, the first temporal layer (e.g., first temporal layer 114) may transmit, to readout and prediction unit 116, the extracted data (e.g., data may describe the transmission of the consumer request).

Figure 2E:
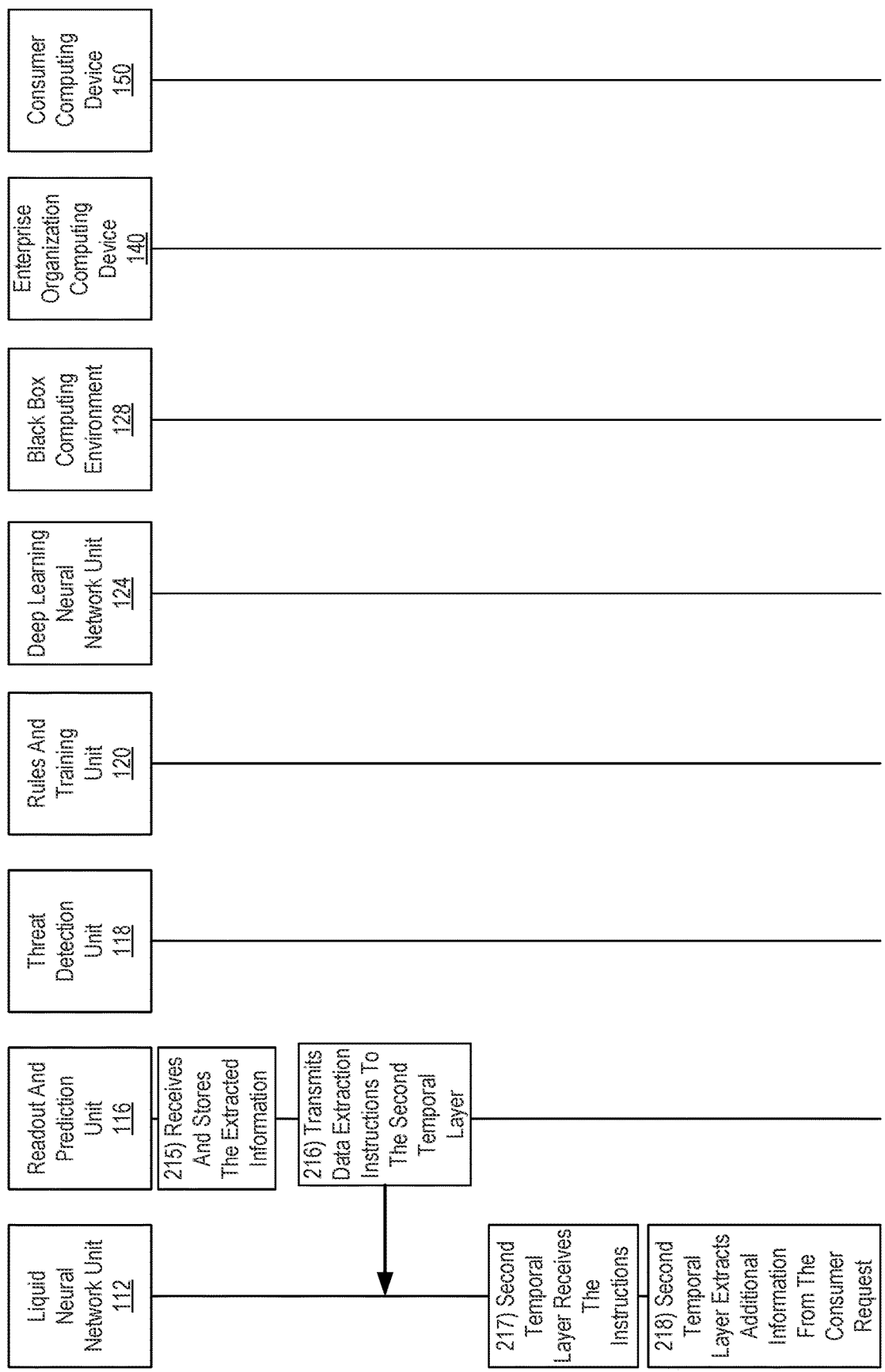

Referring to FIG. 2E, at step 215, readout and prediction unit 116 may receive, from the first temporal layer of liquid neural network unit 112 (e.g., first temporal layer 114), data that was extracted from the consumer request (e.g., data that may describe the transmission of the consumer request). Readout and prediction unit 116 may store the extracted data in consumer request database 111.

At step 216, readout and prediction unit 116 may transmit, to a temporal layer of liquid neural network unit 112 (e.g., second temporal layer 115) instructions to extract additional data from the consumer request. At step 217, the second temporal layer (e.g., second temporal layer 115) may receive, from readout and prediction unit 116, the instructions to extract additional data from the consumer request. The instructions may indicate the type of data to be extracted from the consumer request. For example, the instructions may instruct the second temporal layer (e.g., second temporal layer 115) to extract data that may describe the content of the consumer request (e.g., the consumer's and/or the consumer computing device's affiliation with the enterprise organization, authorization credentials associated with the consumer and/or the consumer computing device, whether the consumer request contains embedded data, whether embedded data within the consumer request is malicious data, or the like).

At step 218, the second temporal layer (e.g., second temporal layer 115) may extract data from the consumer request in accordance with the instructions from readout and prediction unit 116. Referring to FIG. 2F, at step 219, the second temporal layer (e.g., second temporal layer 115) may transmit, to readout and prediction unit 116, the extracted data (e.g., data that may describe the content of the consumer request).

At step 220, readout and prediction unit 116 may receive, from the second temporal layer of liquid neural network unit 112 (e.g., second temporal layer 115), data that was extracted from the consumer request (e.g., data that may describe the content of the consumer request). Readout and prediction unit 116 may store the extracted data in consumer request database 111.

While the present disclosure may describe transmitting data extraction instructions to two temporal layers of liquid neural network unit 112 and receiving extracted data from the two temporal layers, readout and prediction unit 116 may transmit data extraction instructions to additional temporal layers of liquid neural network unit 112 (not depicted in FIG. 2B) and may receive extracted data from the additional temporal layers without departing from the present disclosure. Two temporal layers are described herein solely for illustration purposes.

At step 221, readout and prediction unit 116 may use the extracted information to generate rules that may be used to train deep learning neural network unit 124. As discussed in step 210, readout and prediction unit 116 may predict a plurality of methods that consumer computing device 150 may use to access the enterprise organization data. Readout and prediction unit 116 may formulate a plurality of strategies to protect the enterprise organization data against each predicted method. Each strategy may feature a plurality of rules. To generate the rules, readout and prediction unit 116 may use the extracted data received from the temporal layers of liquid neural network unit 112 (e.g., first temporal layer 114 and second temporal layer 115). Readout and prediction unit 116 may store the rules within rules database 117.

For example, readout and prediction unit 116 may predict that consumer computing device 150 may access the enterprise organization data by accessing a database that stores the enterprise organization data. Readout and prediction unit 116 may determine that one example strategy to protect the database that contains the enterprise organization data may be to strengthen the database security protocols. Readout and prediction unit 116 may examine the extracted information received from the temporal layers of liquid neural network unit 112. Readout and prediction unit 116 may determine that consumer computing device 150 may have authorization credentials associated with the enterprise organization and may determine that the consumer request may contain malicious data. Readout and prediction unit 116 may determine that one example rule to strengthen the database security protocols may be to increase the number of authorization credentials that may be needed to gain access to the database such that the authorization credentials affiliated with consumer computing device 150 might not be sufficient to gain access to the database.

Figure 2G:
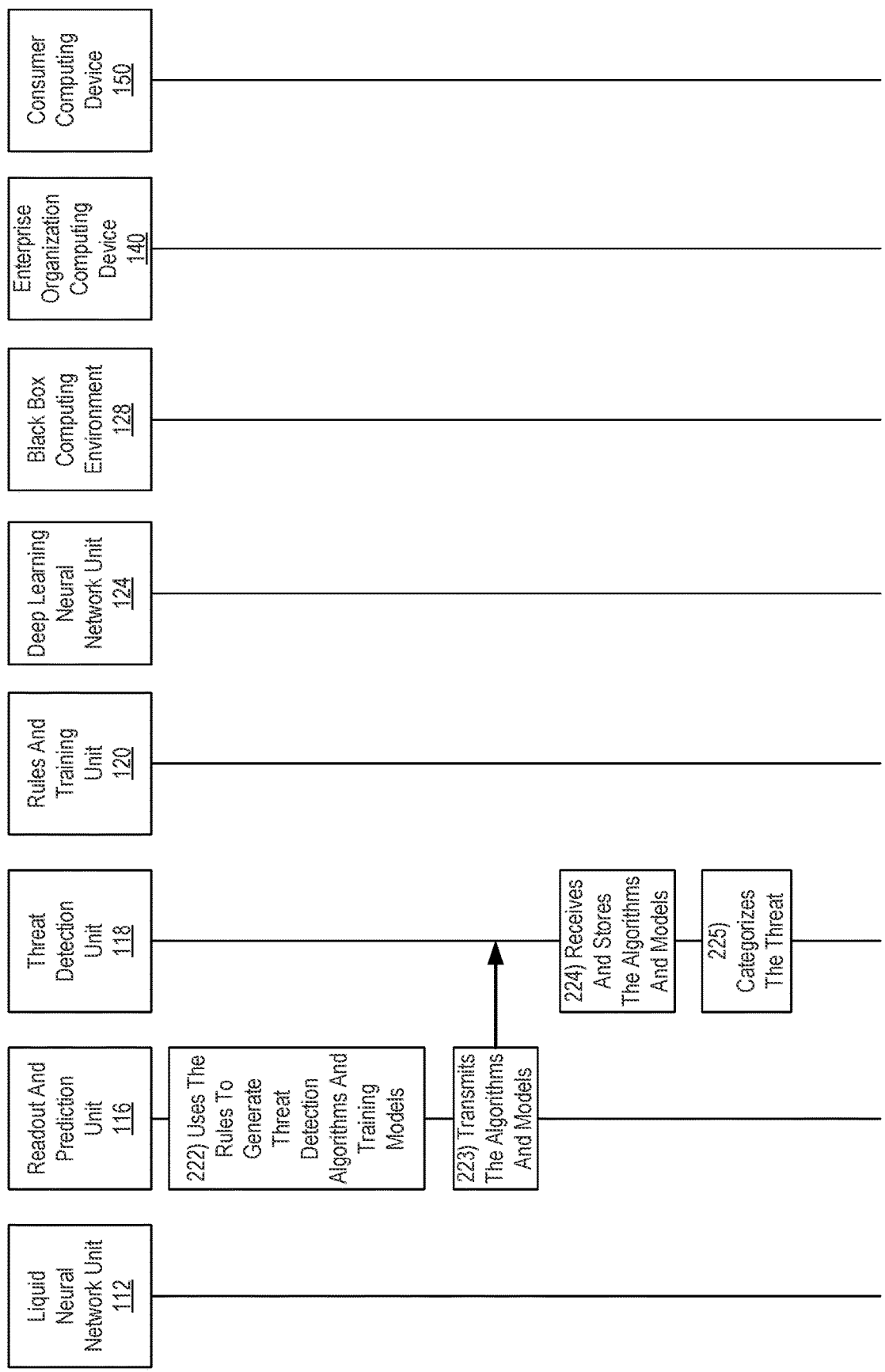

Referring to FIG. 2G, at step 222, readout and prediction unit 116 may use the rules generated in step 221 to generate threat detection algorithms and training models. To generate the threat detection algorithms, readout and prediction unit 116 may use the extracted information received from the temporal layers of liquid neural network unit 112 (e.g., first temporal layer 114 and second temporal layer 115). In some instances, the threat detection algorithms may contain rules for locating, within a consumer request, data that may identify the consumer or the consumer computing device (e.g., consumer computing device 150). In some instances, the threat detection algorithms may contain rules for locating, within a consumer request, data that may describe the content of the consumer request and the transmission of the consumer request. An example threat detection algorithm may instruct deep learning neural network unit 124 to parse the consumer request to locate a unique identifier associated with the consumer or the consumer computing device (e.g., a name, a serial number, an authorization identification code, or the like).

To generate the training models, readout and prediction unit 116 may use the strategies listed in the protection plan. The strategies within the protection plan may contain rules (e.g., a course of action) for protecting the enterprise organization data from unauthorized access. In some instances, the training models may contain rules for determining the enterprise organization data that may be at risk (e.g., the enterprise organization data that the consumer may be interested in). In some instances, the training models may contain rules for strengthening the enterprise organization security infrastructure. An example training model may instruct deep learning neural network unit 124 to parse the content of the consumer request to identify the enterprise organization data that may be at risk, to identify the location of the at-risk enterprise organization data, and to increase the level of clearance that may access the at-risk enterprise organization data such that entities that might not have the appropriate clearance level may be denied access to the at-risk enterprise organization data.

At step 223, readout and prediction unit 116 may transmit the threat detection algorithms and the training models to threat detection unit 118. At step 224, threat detection unit 118 may receive, from readout and prediction unit 116, the threat detection algorithms and the training models. Threat detection unit 118 may store the threat detection algorithms and the training models within training data database 119. Threat detection unit 118 may be associated with a first level of access (e.g., a least restrictive level of access). As such, threat detection unit 118 may be permitted to perform a number of actions upon the data within training data database 119 (e.g., add new data, remove existing data, edit data, re-organize data, update data, or the like).

At step 225, threat detection unit 118 may use the threat detection algorithms and the training models to categorize the threat. Threat detection unit 118 may analyze the threat detection algorithms and the training models to identify the purpose of the consumer request. Threat detection unit 118 may use the purpose of the consumer request to label the threat (e.g., name the threat, attach a unique identifier to the threat, provide a description of the threat, or the like). Threat detection unit 118 may store the categorized threat in training data database 119.

For example, threat detection unit 118 may determine that a training model contains strategies for protecting the enterprise organization data from malicious data. Threat detection unit 118 may determine that the purpose of the consumer request may be to compromise the security of the enterprise organization data using malicious data. As such, threat detection unit 118 may label the threat as "Malicious_Data_Attempt_01."

Referring to FIG. 2H, at step 226, threat detection unit 118 may transmit the threat detection algorithms, the training models, and the categorized threat to rules and training unit 120.

At step 227, rules and training unit 120 may receive the threat detection algorithms, the training models, and the categorized threat transmitted from threat detection unit 118. At step 228, rules and training unit 120 may store the categorized threat in threat database 121. Rules and training unit 120 may be associated with a first level of access (e.g., a least restrictive level of access). As such, rules and training unit 120 may be permitted to perform a number of actions upon the data within threat database 121 (e.g., add new data, remove existing data, edit data, re-organize data, update data, or the like).

At step 229, rules and training unit 120 may store the threat detection algorithms and the training models in threat detection algorithms and training models database 122. Rules and training unit 120 may be associated with a first level of access (e.g., a least restrictive level of access). As such, rules and training unit 120 may be permitted to perform a number of actions upon the data within threat detection algorithms and training models database 122 (e.g., add new data, remove existing data, edit data, re-organize data, update data, or the like).

Referring to FIG. 2I, at step 230, rules and training unit 120 may transmit, to homomorphic encryption layer 123, instructions to encrypt the threat detection algorithms, the training models, and the categorized threat. At step 231, homomorphic encryption layer 123 may receive, from rules and training unit 120, instructions to encrypt the threat detection algorithms, the training models, and the categorized threat, and may encrypt the received data. To do so, homomorphic encryption layer 123 may generate a key pair. The key pair may contain a public key that may be used to encrypt the data and a private key that may be used to access the encrypted data. Homomorphic encryption layer 123 may use the public key to encrypt the threat detection algorithms, the training models, and the categorized threat.

Referring to FIG. 2J, at step 232, rules and training unit 120 may store the encrypted data. Rules and training unit 120 may store the encrypted categorized threat and the private keys associated with the encrypted categorized threat in threat database 121. Rules and training unit 120 may store the encrypted threat detection algorithms, the encrypted training models, and the private keys associated with the encrypted threat detection algorithms and the encrypted training models in threat detection algorithms and training models database 122.

At step 233, rules and training unit 120 may transmit, to deep learning neural network unit 124, the encrypted threat detection algorithms, the encrypted training models, the encrypted categorized threat, and the private keys that may be used to access the encrypted data. At step 234, deep learning neural network unit 124 may receive the encrypted threat detection algorithms, the encrypted training models, the encrypted categorized threat, and the private keys. Deep learning neural network unit 124 may store the encrypted threat detection algorithms, the encrypted training models, the encrypted categorized threat, and the private keys in learning data database 127. Deep learning neural network unit 124 may be associated with a first level of access (e.g., a least restrictive level of access). As such, deep learning neural network unit 124 may be permitted to perform a number of actions upon the data within learning data database 127 (e.g., add new data, remove existing data, edit data, re-organize data, update data, or the like).

At step 235, deep learning neural network unit 124 may transmit, to protection layer 125, instructions to duplicate the threat. Referring to FIG. 2K, at step 236, protection layer 125 may receive, from deep learning neural network unit 124, the instructions to duplicate the threat.

At step 237, protection layer 125 may duplicate the threat. To do so, protection layer 125 may use the private key associated with the encrypted categorized threat to access the threat. Protection layer 125 may deconstruct the threat into discrete data components (e.g., discrete pieces of data). Protection layer 125 may duplicate (e.g., clone, copy, or the like) each discrete data component. Protection layer 125 may assemble the duplicated data components such that, when combined, the duplicated data components create an identical threat.

Protection layer 125 may store the duplicated attack within duplicated threat database 126. Protection layer 125 may be associated with a first level of access (e.g., a least restrictive level of access). As such, protection layer 125 may be permitted to perform a number of actions upon the data within duplicated threat database 126 (e.g., add new data, remove existing data, edit data, re-organize data, update data, or the like).

At step 238, deep learning neural network unit 124 may establish a network connection with black box computing environment 128. Deep learning neural network unit 124 may establish the connection across network 160.

At step 239, protection layer 125 may study within, black box computing environment 128, the duplicated threat to learn the threat techniques utilized by the consumer associated with consumer computing device 150. Black box computing environment 128 may be associated with transmission criteria that might not be detectable (e.g., an IP address that might not be traced, a network connection that might not be traced, or the like). As such, consumer computing device 150 might not be able to trace the deconstruction and duplication of the threat to protection layer 125 of deep learning neural network unit 124.

Figure 3:
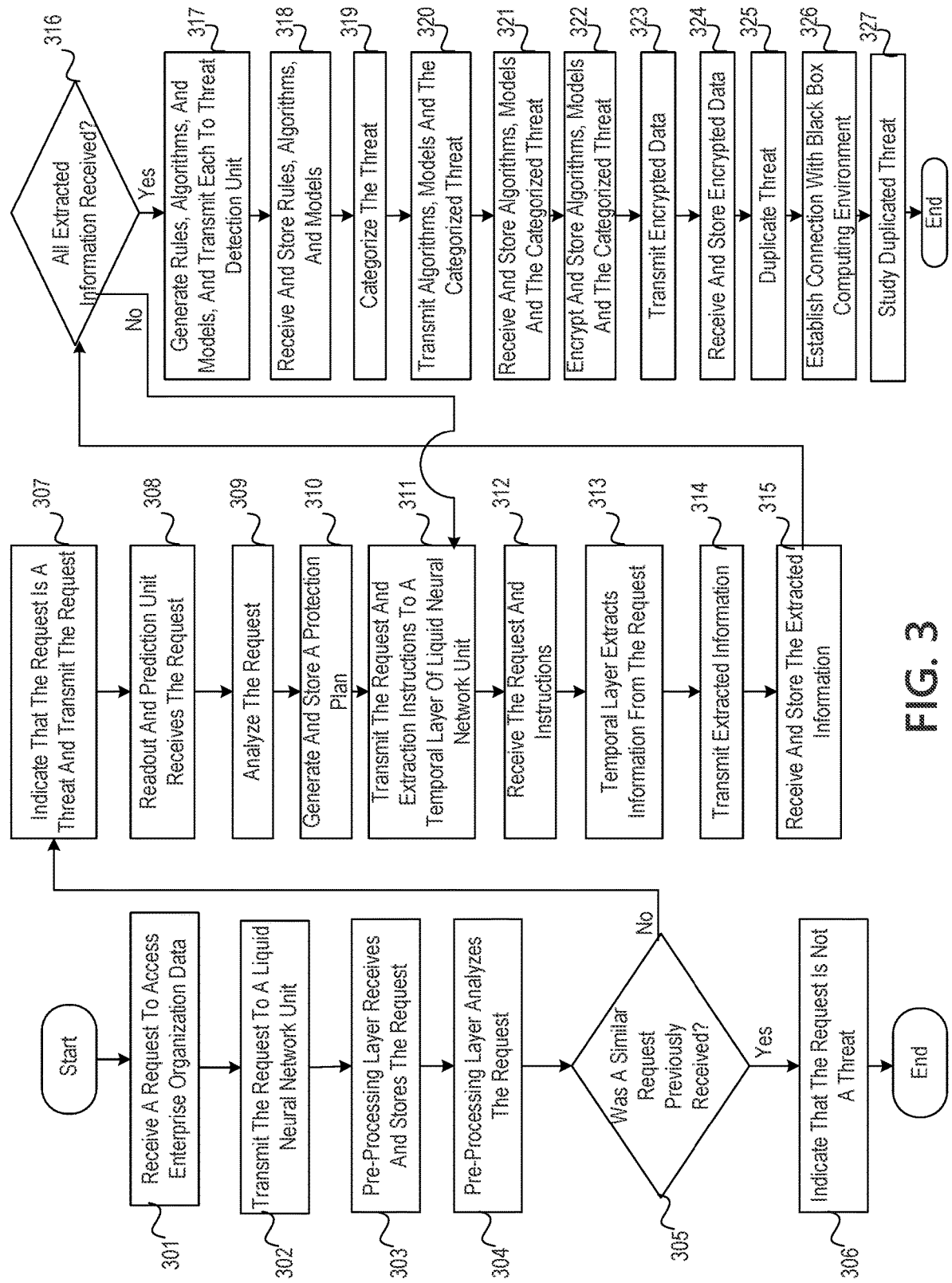
FIG. 3 depicts an illustrative method for enhancing hybrid traditional neural networks with liquid neural network units for cyber security and offense protection in accordance with one or more example embodiments.

FIG. 3 depicts a flow diagram illustrating one example method for enhancing hybrid traditional neural networks with liquid neural networks for cyber security and offense protection in accordance with one or more aspects described herein. The processes illustrated in FIG. 3 are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIG. 3 may be performed in real-time or near real-time.

At step 301, enterprise organization computing device 140 may receive, from consumer computing device 150, a consumer request to access enterprise organization data. At step 302, enterprise organization computing device 140 may transmit the consumer request to liquid neural network unit 112 for processing.

At step 303, pre-processing layer 113 of liquid neural network unit 112 may receive the consumer request and may store the consumer request in consumer request database 111. At step 304, pre-processing layer 113 may analyze the consumer request by comparing the current consumer request to the previously received consumer requests stored in consumer request database 111.

At step 305, pre-processing layer 113 may determine whether a similar consumer request was previously received, processed, and stored in consumer request database 111. At step 306, pre-processing layer 113 may determine that consumer request database 111 contains a previously processed consumer request that is similar to the current consumer request. In such instances, pre-processing layer 113 may transmit a notification to enterprise organization computing device 140 indicating that the current consumer request might not be flagged as a threat to the enterprise organization. Pre-processing layer 113 may remove the consumer request from further processing and may handle the present consumer request using the same, or substantially similar, techniques that were used to handle the previously received consumer requests.

Alternatively, at step 305, pre-processing layer 113 may determine that consumer request database 111 might not contain a previously processed consumer request that is similar to the current consumer request. At step 307, may transmit a notification to enterprise organization computing device 140 indicating that the current consumer request may be flagged as a threat to the enterprise organization. The notification may further indicate that pre-processing layer 113 may transmit the consumer request to readout and prediction unit 116 for further processing. Pre-processing layer 113 may transmit the consumer request to readout and prediction unit 116

At step 308, readout and prediction unit 116 may receive the consumer request from pre-processing layer 113. At step 309, readout and prediction unit 116 may analyze the consumer request. Readout and prediction unit 116 may identify the enterprise organization data that consumer computing device 150 may be interested in and may predict a plurality of methods that consumer computing device 150 may use to access the enterprise organization data. Readout and prediction unit 116 may formulate a plurality of strategies to protect the enterprise organization data against each predicted method that consumer computing device 150 may use to access the enterprise data.

At step 310, readout and prediction unit 116 may generate a protection plan to safeguard the enterprise organization data from unauthorized access by consumer computing device 150. The protection plan may indicate the plurality of predicted methods that consumer computing device 150 may use to access the enterprise organization data. For each predicted method listed within the protection plan, readout and prediction unit 116 may formulate rules to protect the enterprise organization data. Readout and prediction unit 116 may store the protection plan in rules database 117.

At step 311, readout and prediction unit 116 may transmit, to a temporal layer of liquid neural network unit 112 (e.g., either one of first temporal layer 114 or second temporal layer 115), the consumer request and instructions to extract data from the consumer request.

At step 312, the temporal layer (e.g., either one of first temporal layer 114 or second temporal layer 115) may receive, from readout and prediction unit 116, the instructions to extract data from the consumer request. In some instances, the instructions may instruct the temporal layer (e.g., either one of first temporal layer 114 or second temporal layer 115) to extract data that may describe the transmission of the consumer request (e.g., a unique identifier associated with the consumer, a unique identifier associated with the consumer computing device, a unique identifier associated with the location of the consumer computing device, a network used to transmit the consumer request, or the like). In some instances, the instructions may instruct the temporal layer (e.g., either one of first temporal layer 114 or second temporal layer 115) to extract data that may describe the content of the consumer request (e.g., the consumer's and/or the consumer computing device's affiliation with the enterprise organization, authorization credentials associated with the consumer and/or the consumer computing device, whether the consumer request contains embedded data, whether embedded data within the consumer request is malicious data, or the like).

At step 313, the temporal layer (e.g., either one of first temporal layer 114 or second temporal layer 115) may extract data from the consumer request in accordance with the instructions from readout and prediction unit 116. At step 314, the temporal layer (e.g., either one of first temporal layer 114 or second temporal layer 115) may transmit the extracted data to readout and prediction unit 116.

At step 315, readout and prediction unit 116 may receive, from the temporal layer of liquid neural network unit 112 (e.g., either one of first temporal layer 114 or second temporal layer 115), data that was extracted from the consumer request. Readout and prediction unit 116 may store the extracted data in consumer request database 111.

At step 316, readout and prediction unit 116 may determine whether further data may be extracted from the consumer request (e.g., data that may describe the transmission of the consumer request, data that may describe the content of the consumer request, or the like). Readout and prediction unit 116 may determine that additional data may be extracted from the consumer request. In such instances, readout and prediction unit 116 may repeat steps 311 to 316 until readout and prediction unit 116 determines that further data might not be extracted from the consumer request.

Alternatively, at step 316, readout and prediction unit 116 may determine that all of the data within the consumer request has been extracted.

At step 317, readout and prediction unit 116 may use the extracted information to generate rules, threat detection algorithms, and training models that may be used to train deep learning neural network unit 124. To generate the rules, readout and prediction unit 116 may use the extracted data received from the temporal layers of liquid neural network unit 112 (e.g., first temporal layer 114 and second temporal layer 115).

To generate the threat detection algorithms, readout and prediction unit 116 may use the extracted information received from the temporal layers of liquid neural network unit 112 (e.g., first temporal layer 114 and second temporal layer 115). In some instances, the threat detection algorithms may contain rules for locating, within a consumer request, data that may identify the consumer or the consumer computing device (e.g., consumer computing device 150). In some instances, the threat detection algorithms may contain rules for locating, within a consumer request, data that may describe the content of the consumer request and the transmission of the consumer request.

To generate the training models, readout and prediction unit 116 may use the strategies listed in the protection plan. The strategies within the protection plan may contain rules (e.g., a course of action) for protecting the enterprise organization data from unauthorized access. In some instances, the training models may contain rules for determining the enterprise organization data that may be at risk (e.g., the enterprise organization data that the consumer may be interested in). In some instances, the training models may contain rules for strengthening the enterprise organization security infrastructure. Readout and prediction unit 116 may transmit the rules, threat detection algorithms, and training models to threat detection unit 118.

At step 318, threat detection unit 118 may receive, from readout and prediction unit 116, the rules, threat detection algorithms, and training models. Threat detection unit 118 may store the threat detection algorithms and the training models within training data database 119.

At step 319, threat detection unit 118 may use the threat detection algorithms and training models to categorize the threat. Threat detection unit 118 may analyze the threat detection algorithms and training models to identify the purpose of the consumer request. Threat detection unit 118 may use the purpose of the consumer request to label the threat (e.g., name the threat, attach a unique identifier to the threat, provide a description of the threat, or the like). Threat detection unit 118 may store the categorized threat in training data database 119.

At step 320, threat detection unit 118 may transmit the threat detection algorithms, training models, and categorized threat to rules and training unit 120. At step 321, rules and training unit 120 may receive the threat detection algorithms, training models, and categorized threat transmitted from threat detection unit 118. Rules and training unit 120 may store the categorized threat in threat database 121. Rules and training unit 120 may store the threat detection algorithms and training models in threat detection algorithms and training models database 122.

At step 322, homomorphic encryption layer 123 of rules and training unit 120 may encrypt the threat detection algorithms, training models, and categorized threat. Homomorphic encryption layer 123 may generate a key pair comprising a public key and a private key. The public key that may be used to encrypt the data and the private key that may be used to access the encrypted data. Homomorphic encryption layer 123 may use the public key to encrypt the threat detection algorithms, training models, and categorized threat.

Rules and training unit 120 may store the encrypted categorized threat and the private keys associated with the encrypted categorized threat in threat database 121. Rules and training unit 120 may store the encrypted threat detection algorithms, the encrypted training models, and the private keys associated with the encrypted threat detection algorithms and the encrypted training models in threat detection algorithms and training models database 122.

At step 323, rules and training unit 120 may transmit, to deep learning neural network unit 124, the encrypted threat detection algorithms, encrypted training models, encrypted categorized threat, and the private keys that may be used to access the encrypted data.

At step 324, deep learning neural network unit 124 may receive the encrypted threat detection algorithms, encrypted training models, encrypted categorized threat, and the private keys. Deep learning neural network unit 124 may store the encrypted threat detection algorithms, encrypted training models, encrypted categorized threat, and the private keys in learning data database 127.

At step 325, protection layer 125 of deep learning neural network unit 124 may duplicate the threat. Protection layer 125 may use the private key associated with the encrypted categorized threat to access the threat. Protection layer 125 may deconstruct the threat into discrete data components (e.g., discrete pieces of data). Protection layer 125 may duplicate (e.g., clone, copy, or the like) each discrete data component. Protection layer 125 may assemble the duplicated data components such that, when combined, the duplicated data components create an identical or substantially identical threat.

At step 326, deep learning neural network unit 124 may establish a network connection with black box computing environment 128. At step 327, protection layer 125 may study within, black box computing environment 128, the duplicated threat to learn the threat techniques utilized by the consumer associated with consumer computing device 150. Black box computing environment 128 may be associated with transmission criteria that might not be detectable (e.g., an IP address that might not be traced, a network connection that might not be traced, or the like). As such, consumer computing device 150 might not be able to trace the deconstruction and duplication of the threat to protection layer 125 of deep learning neural network unit 124.

Aspects described herein allow a liquid neural network unit to train a deep learning neural network unit to process incoming data (e.g., consumer requests) in a time series and to predict techniques for handling the data based on sequences within the data stream. The liquid neural network unit may engage in active learning by generating, in real-time and based on novel consumer requests, temporal layers that may extract data from the consumer requests. The liquid neural network unit may use the extracted data to develop training models and threat detection algorithms that may be used to detect and diffuse the variability of cyber threats.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a consumer computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    at a computing device including one or more processors and memory:
        receiving a consumer request to access enterprise organization data;
        determining, by a liquid neural network unit, that the consumer request is a threat to an enterprise organization;
        generating, by a readout and prediction unit, rules and algorithms to handle the threat;
        transmitting, to a rules and training unit and from the readout and prediction unit, the rules and the algorithms;
        encrypting, by the rules and training unit, the rules and the algorithms;
        transmitting, from the rules and training unit and to a deep learning neural network, the encrypted rules and the encrypted algorithms;
        training the deep learning neural network to handle the threat using the encrypted rules and the encrypted algorithms;
        duplicating, by the deep learning neural network and in a black box computing environment, the threat; and
        training the deep learning neural network to detect and handle threat techniques used in the duplicated threat.

2. The method of claim 1, wherein the determining further comprises:
    extracting data from the consumer request;
    comparing the extracted data to previous consumer requests;
    determining whether the extracted data is similar to at least one previous consumer request; and
    transmitting a notification, wherein the notification indicates one of:
        a negative threat detection, based on the extracted data matching the at least one previous consumer request; or
        a positive threat detection, based on the extracted data failing to match the at least one previous consumer request.

3. The method of claim 2, wherein the generating further comprises:
    identifying, from the extracted data, information indicating at least one of:
        an origin of the consumer request;
        a segment of the enterprise organization data targeted by the consumer request; or
        authorization credentials to access the enterprise organization data; and
    determining, using the information, a strategy to protect the enterprise organization data.

4. The method of claim 1, wherein the rules and the algorithms comprise at least one of:
    a training model; or
    a threat detection algorithm.

5. The method of claim 4, wherein the training model comprises instructions for:

storing, by the deep learning neural network, the rules and
the algorithms generated by the readout and prediction
unit;
accessing, by the deep learning neural network, the rules
and the algorithms upon receipt of a second consumer
request; and
implementing, by the deep learning neural network, the
rules and the algorithms to handle the second consumer
request.

6. The method of claim 5, wherein the threat detection algorithm comprises instructions for comparing, by the deep learning neural network, the second consumer request to previous consumer requests to determine whether the second consumer request is a second threat.

7. The method of claim 1, wherein the duplicating further comprises:
deconstructing the threat into discrete components;
duplicating each discrete component; and
reconstructing the discrete components into a duplicate threat.

8. A computing platform comprising:
at least one processor;
a communication interface communicatively coupled to the at least one processor; and
memory storing computer-readable instructions that, when executed by the at least one processor, cause the computing platform to:
receive a consumer request to access enterprise organization data;
determine, by a liquid neural network unit, that the consumer request is a threat to an enterprise organization;
generate, by a readout and prediction unit, rules and algorithms to handle the threat;
transmit, to a rules and training unit and from the readout and prediction unit, the rules and the algorithms;
encrypt, by the rules and training unit, the rules and the algorithms;
transmit, from the rules and training unit and to a deep learning neural network, the encrypted rules and the encrypted algorithms;
train the deep learning neural network to handle the threat using the encrypted rules and the encrypted algorithms;
duplicate, by the deep learning neural network and in a black box computing environment, the threat; and
train the deep learning neural network to detect and handle threat techniques used in the duplicated threat.

9. The computing platform of claim 8, wherein the determining further causes the computing platform to:
extract data from the consumer request;
compare the extracted data to previous consumer requests;
determine whether the extracted data is similar to at least one previous consumer requests; and
transmit a notification, wherein the notification indicates one of:
a negative threat detection, based on the extracted data matching the at least one previous consumer request; or
a positive threat detection, based on the extracted data failing to match the at least one previous consumer request.

10. The computing platform of claim 9, wherein the generating further causes the computing platform to:

identify, from the extracted data, information indicating at least one of:
an origin of the consumer request;
a segment of the enterprise organization data targeted by the consumer request; or
authorization credentials to access the enterprise organization data; and
determine, using the information, a strategy to protect the enterprise organization data.

11. The computing platform of claim 8, wherein the rules and the algorithms comprise at least one of:
a training model; or
a threat detection algorithm.

12. The computing platform of claim 11, wherein the training model further causes the computing platform to generate instructions for:
storing, by the deep learning neural network, the rules and the algorithms generated by the readout and prediction unit;
accessing, by the deep learning neural network, the rules and the algorithms upon receipt of a second consumer request; and
implementing, by the deep learning neural network, the rules and the algorithms to handle the second consumer request.

13. The computing platform of claim 8, wherein the duplicating causes the computing platform to generate instructions for:
deconstructing the threat into discrete components;
duplicating each discrete component; and
reconstructing the discrete components into a duplicate threat.

14. One or more non-transitory computer-readable media storing instructions that, when executed by a computing platform comprising at least one processor, memory, and a communication interface, cause the computing platform to:
receive a consumer request to access enterprise organization data;
determine, by a liquid neural network unit, that the consumer request is a threat to an enterprise organization;
generate, by a readout and prediction unit, rules and algorithms to handle the threat;
transmit, to a rules and training unit and from the readout and prediction unit, the rules and the algorithms;
encrypt, by the rules and training unit, the rules and the algorithms;
transmit, from the rules and training unit and to a deep learning neural network, the encrypted rules and the encrypted algorithms;
train the deep learning neural network to handle the threat using the encrypted rules and the encrypted algorithms;
duplicate, by the deep learning neural network and in a black box computing environment, the threat; and
train the deep learning neural network to detect and handle threat techniques used in the duplicated threat.

15. The one or more non-transitory computer-readable media of claim 14, wherein the determining further causes the computing platform to:
extract data from the consumer request;
compare the extracted data to previous consumer requests;
determine whether the extracted data is similar to at least one previous consumer requests; and
transmit a notification, wherein the notification indicates one of:

a negative threat detection, based on the extracted data matching the at least one previous consumer request; or a positive threat detection, based on the extracted data failing to match the at least one previous consumer request.

16. The computing platform of claim 15, wherein the generating further causes the computing platform to:

identify, from the extracted data, information indicating at least one of:
an origin of the consumer request;
a segment of the enterprise organization data targeted by the consumer request; or
authorization credentials to access the enterprise organization data; and determine, using the information, a strategy to protect the enterprise organization data.

17. The computing platform of claim 14, wherein the rules and the algorithms comprises at least one of:
a training model; or
a threat detection algorithm.

18. The computing platform of claim 17, wherein the training model further causes the computing platform to generate instructions for:

storing, by the deep learning neural network, the rules and the algorithms generated by the readout and prediction unit;

accessing, by the deep learning neural network, the rules and the algorithms upon receipt of a second consumer request; and implementing, by the deep learning neural network, the rules and the algorithms to handle the second consumer request.

19. The computing platform of claim 18, wherein the threat detection algorithm further causes the computing platform to generate instructions for comparing, by the deep learning neural network, the second consumer request to previous consumer requests to determine whether the second consumer request is a second threat.

20. The computing platform of claim 14, wherein the duplicating causes the computing platform to generate instructions for:
deconstructing the threat into discrete components;
duplicating each discrete component; and
reconstructing the discrete components into a duplicate threat.

* * * * *